US012567611B2

(12) United States Patent
Jacobs et al.

(10) Patent No.: US 12,567,611 B2
(45) Date of Patent: Mar. 3, 2026

(54) INTERWOVEN VOLTAGE SENSE HARNESS OF A BATTERY

(71) Applicant: Rivian IP Holdings, LLC, Irvine, CA (US)

(72) Inventors: Tyler Jacobs, Hawthorne, CA (US); Jonathan Christopher Wilson, Rancho Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/438,797

(22) Filed: Feb. 12, 2024

(65) Prior Publication Data

US 2025/0260078 A1     Aug. 14, 2025

(51) Int. Cl.
| | |
|---|---|
| *H01M 10/48* | (2006.01) |
| *H01M 10/42* | (2006.01) |
| *H01M 50/213* | (2021.01) |
| *H01M 50/242* | (2021.01) |
| *H01M 50/249* | (2021.01) |
| *H01M 50/51* | (2021.01) |
| *H01M 50/516* | (2021.01) |
| *H01M 50/569* | (2021.01) |

(52) U.S. Cl.
CPC ....... *H01M 10/482* (2013.01); *H01M 10/425* (2013.01); *H01M 50/213* (2021.01); *H01M 50/242* (2021.01); *H01M 50/51* (2021.01); *H01M 50/516* (2021.01); *H01M 50/569* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 9,147,875 B1 | 9/2015 | Coakley et al. | |
| 9,545,010 B2 | 1/2017 | Coakley et al. | |
| 9,844,148 B2 | 12/2017 | Coakley et al. | |
| 10,211,443 B2 | 2/2019 | Coakley et al. | |
| 10,964,931 B2 | 3/2021 | Coakley et al. | |
| 11,116,070 B2 | 9/2021 | Coakley et al. | |
| 11,894,580 B2 | 2/2024 | Coakley et al. | |
| 11,979,976 B2 | 5/2024 | Coakley et al. | |
| 12,035,459 B2 | 7/2024 | Coakley et al. | |
| 12,040,511 B2 | 7/2024 | Coakley et al. | |
| 2013/0337291 A1 | 12/2013 | Mayer et al. | |
| 2020/0006720 A1* | 1/2020 | Roelle | H01M 50/51 |
| 2021/0175588 A1 | 6/2021 | Coakley et al. | |
| 2021/0184190 A1* | 6/2021 | Lee | H01M 10/0422 |
| 2021/0351449 A1* | 11/2021 | Seol | H05K 1/028 |

FOREIGN PATENT DOCUMENTS

WO     WO 2023050022     *     4/2023

* cited by examiner

*Primary Examiner* — Jonathan Crepeau
(74) *Attorney, Agent, or Firm* — Foley & Lardner LLP

(57) ABSTRACT

An interwoven voltage sense harness of a battery is provided. A battery system can include cells arranged in an array. The battery system can include a harness. The harness can include a circuit electrically insulated by a material. The harness can extend along a side of the cells. The harness can include a trace. The trace can be electrically coupled to the circuit. The trace can contact each of the cells to measure voltage of the cells. At least one aspect is directed to a method. The method can include providing a battery system comprising a plurality of cells arranged in an array and a harness.

21 Claims, 23 Drawing Sheets

Provide a Battery System

1602

1600

INTERWOVEN VOLTAGE SENSE HARNESS OF A BATTERY

INTRODUCTION

Electric vehicles (EVs) can be powered using batteries that store energy to reduce greenhouse gas emissions. The batteries can include different components facilitating energy storage.

SUMMARY

This disclosure is generally directed to an interwoven voltage sense harness of a battery. An EV can be powered from a battery system having any combination of battery packs, battery modules or battery cells. A battery system can include a plurality of battery cells arranged in an array. Due to the configuration of a battery system in an electric vehicle, the battery system can have physical load placed on the battery system. A voltage sensing component placed on a portion of the battery cells that receives force or supports a load can impact the performance or durability of the voltage sensing component. Manufacturing the voltage sense component to withstand the force from the supported load can utilize excessive materials and increase a size of the battery system and weight of the electric vehicle, which can impact performance of the electric vehicle.

Systems, methods and apparatus of the technical solutions disclosed herein can provide an interwoven voltage sense harness. For example, placing the harness between the cells can remove the harness from the direct load path. The harness can be formed of an electrically insulating material that encapsulates a flexible circuit. The harness can extend along a cylindrical side of the cells, and include an exposed trace that contacts the cells to measure voltage. Thus, the voltage sense harness of this technical solution can improve the durability, performance and compactness of a battery system by being disposed between the cells in the battery system.

An aspect of this disclosure is directed to a battery system. The battery system can include cells arranged in an array. The battery system can include a harness. The harness can include a circuit electrically insulated by a material. The harness can extends along a side of the cells. The harness can include a trace. The trace can be electrically coupled to the circuit. The trace can contact each of the cells to measure voltage of the cells.

At least one aspect is directed to a battery system. The circuit of the battery system can be configured to be flexible. A tab can extend from the harness to contact a top portion of each of the plurality of cells. The side along which the harness extends can be cylindrical. The side along which the harness extends can be prismatic. The material can include an opening to expose the trace to contact each of the plurality of cells.

At least one aspect is directed to a battery system. The harness can be bonded to each of the plurality of cells via an electrical conductor. The harness can be bonded to each of the plurality of cells via at least one of a laser weld or a solder. The harness can extend along a group of cells of the plurality of cells that are connected to form a series circuit. The height of the harness can be less than a height of each of the plurality of cells. The harness can comprise a first portion with a first level of stiffness, and a second portion with a second level of stiffness that can be different than the first level of stiffness. The harness can comprise a first portion that can have an arc shape, and a second portion that can have a planar shape.

At least one aspect is directed to a method. The method can include providing a battery system comprising a plurality of cells arranged in an array and a harness. The harness can comprise a circuit electrically insulated by a material. The harness can extend along a side of the plurality of cells. The harness can include a trace, electrically coupled to the circuit, that can contact each of the plurality of cells to measure voltage of the plurality of cells.

At least one aspect is directed to a method. The side along which the harness extends can be cylindrical. The side along which the harness extends can be prismatic. The material can comprise an opening to expose the trace to contact each of the plurality of cells. The method can include bonding the harness to each of the plurality of cells via an electrical conductor. The harness can extend along a group of cells of the plurality of cells that can be connected to form a series circuit.

At least one aspect is directed to an electric vehicle. The electric vehicle can include a battery system. The battery system can include a plurality of cells arranged in an array. The battery system can include a harness, comprising a circuit electrically insulated by a material. The harness can extend along a side of the plurality of cells. The harness can include a trace, electrically coupled to the circuit, that can contact each of the plurality of cells to measure voltage of the plurality of cells. The harness can comprise a tab that can extend from the harness and can contact a top portion of each of the plurality of cells.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of an interwoven voltage sensing harness of a battery system. The various concepts introduced above and discussed in greater detail below may be implemented in any of numerous ways.

This disclosure is generally directed to a solution for providing efficient integration of a harness with a battery system of an EV. The battery system can be called a battery assembly. The battery system can include an assembly of a battery pack, or a battery module. An EV can store energy in a battery system that can include interconnected battery pack or battery modules. The battery system can include battery cells which can have their voltage measured via a harness. The harness can be called a voltage sensing harness. However, integrating the harness into a battery system can be difficult. For example, placing the harness, which can comprise of delicate features, on the top of the battery system or cell array can make the harness susceptible to damages. It can be difficult as the top of the battery system can be in a direct load path (e.g., mechanical load, electrical load, electrical load). It can be difficult as the harness placed on the top of the battery system can increase the height of the battery system, which can make the battery system not compact.

The present solution can provide efficient integration of a harness with a battery system of an EV. The present solution can effectively utilize the cell-to-cell spacing that would have otherwise been empty or not utilized. The resulting solution can decrease the compressive forces exhibited on the harness. The harness comprising a circuit electrically insulated by a material. The harness can extend along a side of multiple cells arranged in an array. The harness can include a trace, electrically coupled to the circuit, to contact each of the multiple cells to measure voltage of the multiple cells.

Figure 1:
FIG. 1 depicts an example of a battery system with a harness.
Figure 1:
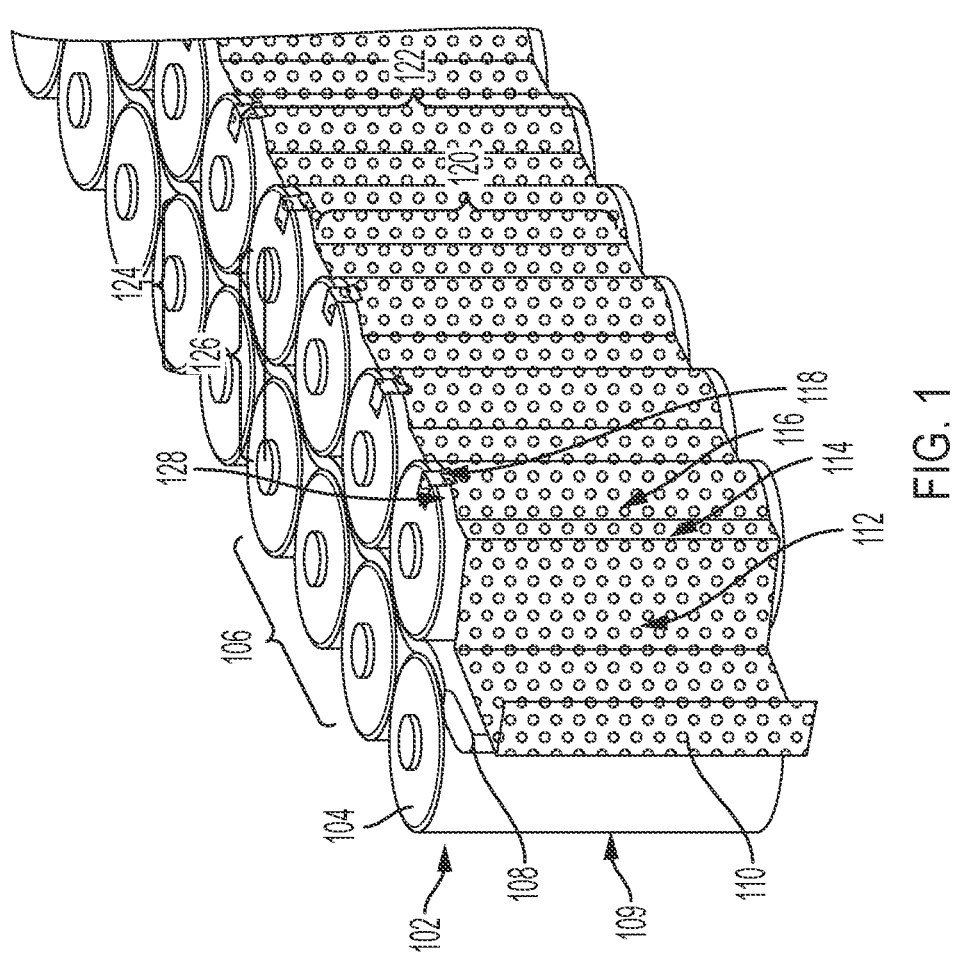

FIG. 1 depicts an example of a battery system 100 with a harness 110. The battery system 100 can include multiple cells 102 arranged in an array 106. The battery system 100 can include a harness 110. The harness 110 can include a circuit electrically insulated by a material. The material can be, but is not limited to, polyvinyl chloride, polyethylene, polypropylene, teflon, mica, or polyimide film. The material can include an opening 128 to expose the trace to contact each of the multiple cells. The opening can allow the trace to form a connection. The shape of the opening can be a small round opening, a slot, or any shape that ensures optimal contact with the cell terminal. The opening can be created by laser cutting, die cutting, or precision molding. The harness 110 can be flat, round, ribbed, smooth, angular, or curved.

The circuit can be flexible. The circuit can include flexible plastic substrates, such as polyimide or polyester film. The circuit can be bent, folded, or rolled to fit various shapes. The circuitry pathways can be formed of thin layers of copper etched onto the flexible substrate. A protective layer can be laminated over the circuit to provide insulation and protection. The harness 110 can extend along a side 109 of the multiple cells 102. The side 109 along which the harness 110 can extend can be cylindrical (e.g., 18650 or 21700 cells). The side 109 along which the harness 110 can extend can be prismatic. The harness 110 can include a trace. The trace can be a tab 118. The trace can be electrically coupled to the circuit. The trace can be a continuous path of conductive material. The conductive material can be copper, silver, aluminum, or gold.

The trace can contact each of the multiple cells 102 to measure voltage of the multiple cells 102. The cells 102 can be pouch, prismatic, 18650, 21700, or 26650. The cells 102 can be a combination of, but not limited to, pouch, prismatic, 18650, 21700, or 26650. The area of contact can be called a point of contact. The area of contact can be at a top portion 104 of the cells 102. The area of contact can be at a bottom portion of the cells 102. The area of contact can be a designated port or connector. The tab 118 can extend from the harness 110 to contact a top portion 104 of each of the multiple cells 102. The tab can be a piece of conductive material that is connected to an electrode inside the cell and protrudes out of the cell to provide an external connection point (e.g., area of contact).

The harness 110 can be bonded to each of the multiple cells 102 by an electrical conductor. The harness 110 can be bonded to each of the multiple cells 102 by, but not limited to, a laser weld or a solder. The harness 110 can be bonded to each of the multiple cells 102 with an adhesive. The adhesive can be located on the harness. The adhesive can be located on the tab. The adhesive can include a pressure sensitive adhesive (PSA), epoxy resin adhesive, polyurethane adhesive, acrylic adhesive, cyanoacrylate adhesive, or silicone adhesive. The adhesive can be an electrically conductive adhesive. The multiple cells 102 can interface with the harness 110 via the adhesive. For example, the adhesive can be a thin layer or can be thermally conductive. The harness 110 can extend along a group of cells 106 of the multiple cells 102 that are connected to form a series circuit. A height of the harness 120 can be less than a height 122 of each of the multiple cells. For example, for an 18650 cylindrical cell with a cell height of 65 mm, the harness 110 can cover three-quarters of the cell height and the height of the harness can be around 49 mm. In another example, a prismatic cell for an electric vehicle with a height 122 of 150 mm can have a harness that can cover the top half of the cell height 122 and the height of the harness 120 can be around 75 mm. The cell height 122 can range from 5 mm to 200 mm. The height of the harness 120 can depend on the lateral/horizontal length of the harness. The height of harness 120 can range from 1% to 99% of the cell height 122.

The harness 110 can have two portions. The harness 110 can include a first portion 116 that have an arc shape, and a second portion 114 that have a planar shape. The harness 110 can be versatile and can accommodate various cell geometries. The harness can interface with both flat and curved cell sides 109. The multiple cells 102 can be placed between a harness 110 on one side and a thermal component 108 on another side. The thermal component 108 can include a fin, barrier, insulation layer, or composite layer. The thermal component 108 can used for or enhance thermal management or insulation, electrical insulation, physical separation or protection, etc.

The multiple cells 102 can be a part of a parallel group (such as parallel group configurations) 126. The parallel group configurations can increase the total capacity of the battery system. The parallel group configurations can spread the current load across multiple cells. Each of the cells 102 can have a diameter 124. The harness 110 can include different portions having different structural features or configurations, or different dimensions. For example, a portion 112 can be planar, straight or more flat relative to a portion 116, which can be arced. In some cases, the flat portion 112 can extend along a different axis relative to the arced portion 116. For example, the flat portion 112 can be perpendicular or otherwise intersect with an axis or segment of the arced portion 116.

Figure 2:
FIG. 2 depicts an example of a battery system with a harness.
Figure 2:
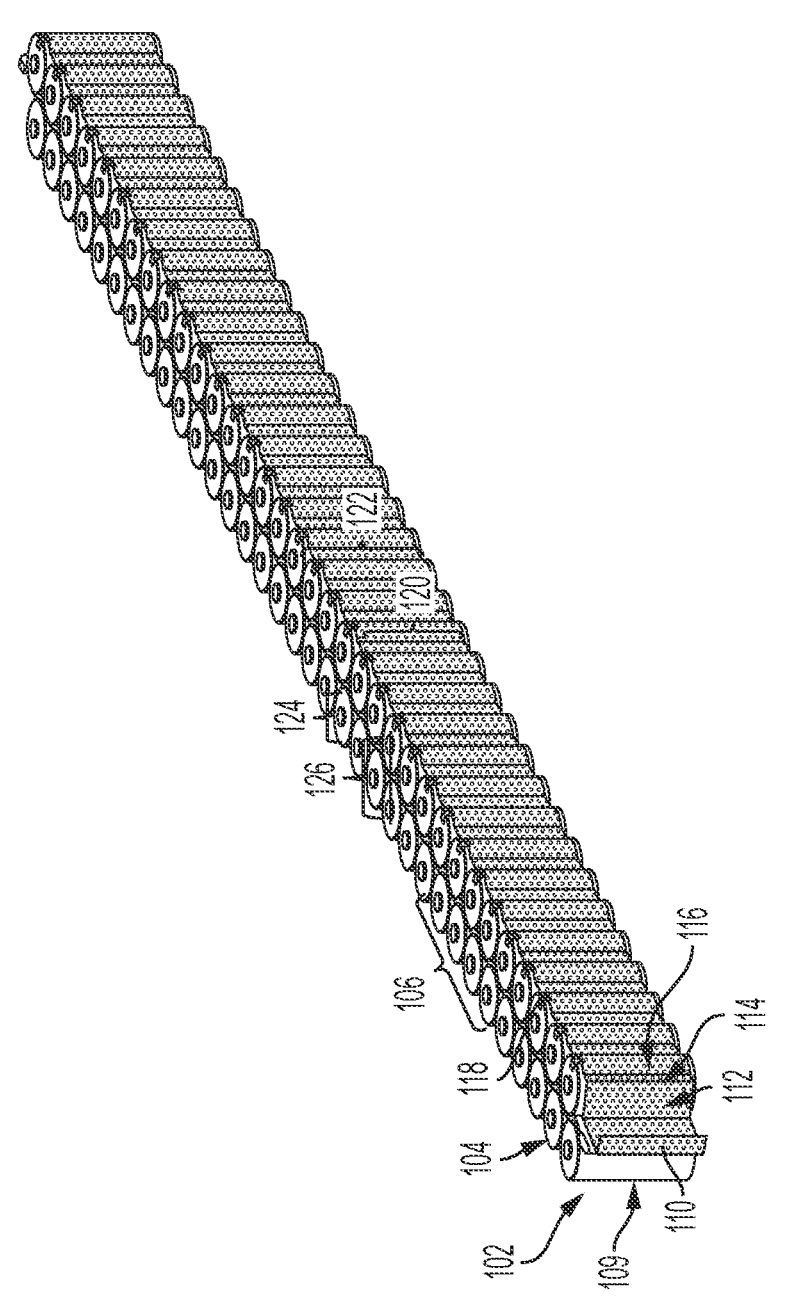

FIG. 2 depicts an example of a battery system 200 with a harness 110. The battery system 200 can include a series, group, string, or chain of cells 102 in series. The number, count or quantity of cells 102 in a chain can be 4, 5, 6, 7, 8, 10, 15, 20, 25, 30, 50, 100, 500, 1000, or more, for example. The length of the harness 110 can be larger than 50 mm. The length of the harness 110 can be 50 mm, 100 mm, 500 mm, 1000 mm, 2000 mm, or 20000 mm. The battery system 200 can include multiple cells 102 arranged in an array 106. The battery system 200 can include a harness 110. The harness 110 can include a circuit electrically insulated by a material. The harness 110 can be at the outer side (e.g., perimeter or exterior) 109 of the cells 102.

Figure 3:
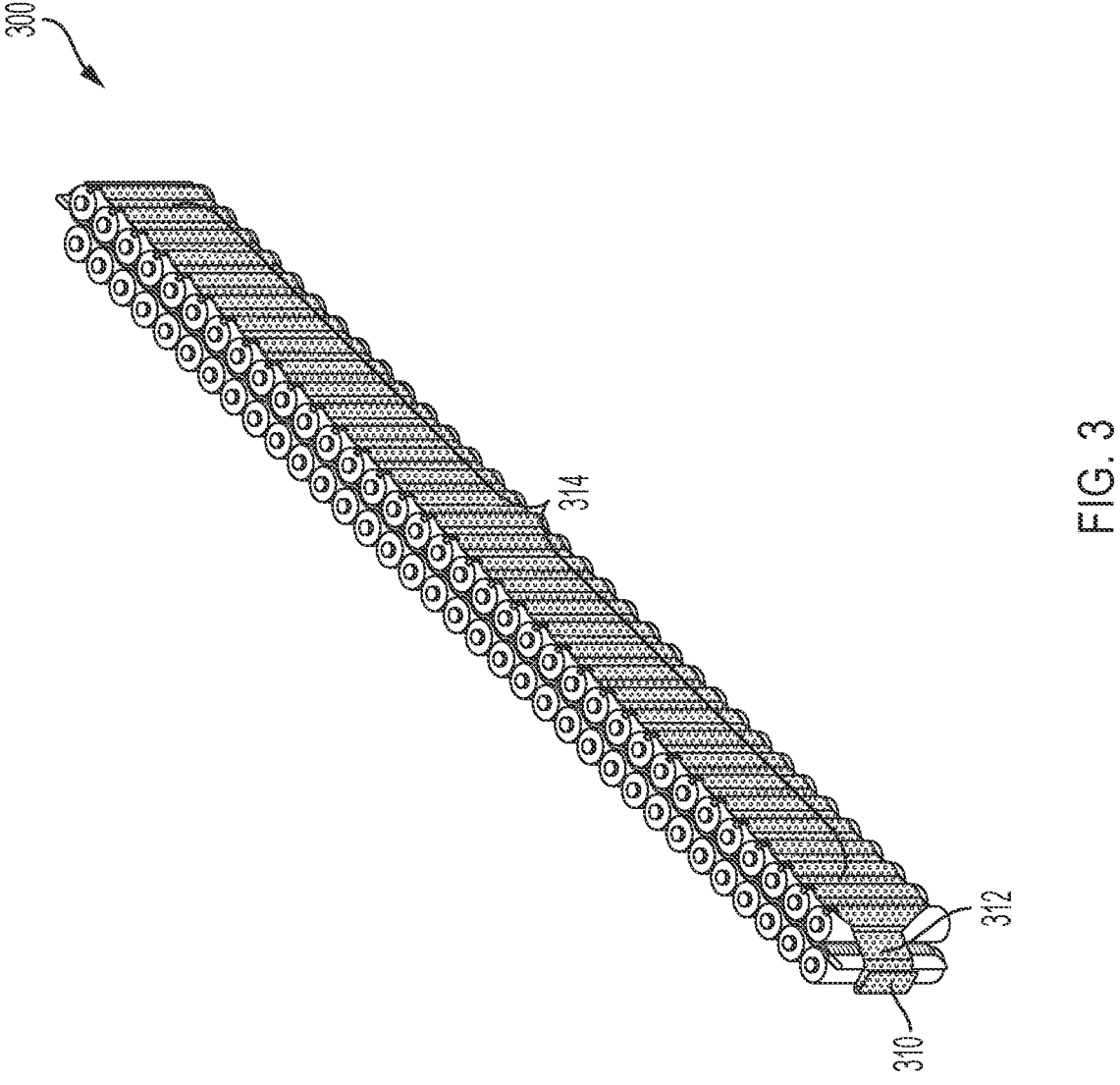
FIG. 3 depicts an example of a battery system with a harness.

FIG. 3 depicts an example of a battery system 300 with a harness. The harness 310 can include one or more component, material, configuration or functionality of harness 110 depicted in FIG. 1. The end of the harness 310 can be curved into a smooth arc or curve. For example, the central angle of the arc can be 30° to form the smooth arc (e.g., curve). The central angle of the arc can be 10°, 30°, 45°, 90°, 100°, 120°, 145°, 160°, 180°, 270°, 290°, 300°, 350° or more. The end of the harness 310 can be curved to form a full or semi-circle. The end of the harness 310 can include a zigzag or wavy pattern. The end of the harness 310 can be sharply bent at an angle. The angle can 10°, 30°, 45°, 90°, 100°, 120°, 145°, 160° or more, for example. The sharp bent can be inwards, outwards, or to the side. The end of the harness 310 can split into two or more pathways. The end of the harness 310 can include thicker materials, thinner materials, additional layers, or embedded structures than the remaining part of the harness. The segment of the harness 312 can be adjacent to the end of the harness 310. The segment of the harness 312 adjacent to the end of the harness 310 can be the same or different than the central body of the harness 314. The segment of the harness 312 can include thicker materials, thinner materials, additional layers, or embedded structures compared to the central body of the harness 314. The segment of the harness 312 can be shorter than the central body of the harness 314. The segment of the harness 312 can have a different shape or design than the central body of the harness 314. The segment of the harness 312 can be flat, round, ribbed, smooth, angular, or curved.

Figure 4:
FIG. 4 depicts an example of a battery system with a harness.
Figure 4:
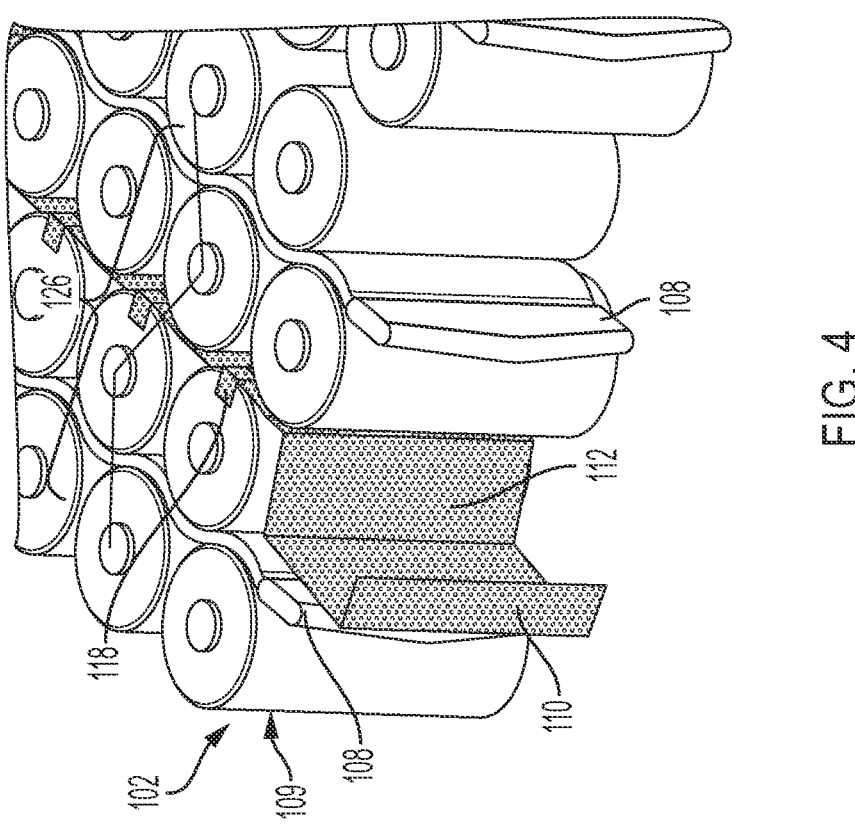

FIG. 4 depicts an example of a battery system 400 with a harness 110 that is between a group of cells 102. The harness 110 can occupy unused space. The harness 110 can be placed between cells 102 that form a parallel group 126. The harness 110 can serve as a protective layer. The harness 110 can include embedded sensors to monitor cell health, voltage, or temperature. The harness 110 be placed between cells 102 can provide quicker and more direct electrical connections compared to a harness placed on the outer side of the cells 102.

Figure 5:
FIG. 5 depicts an example of a balancing voltage and temperature module.
Figure 5:
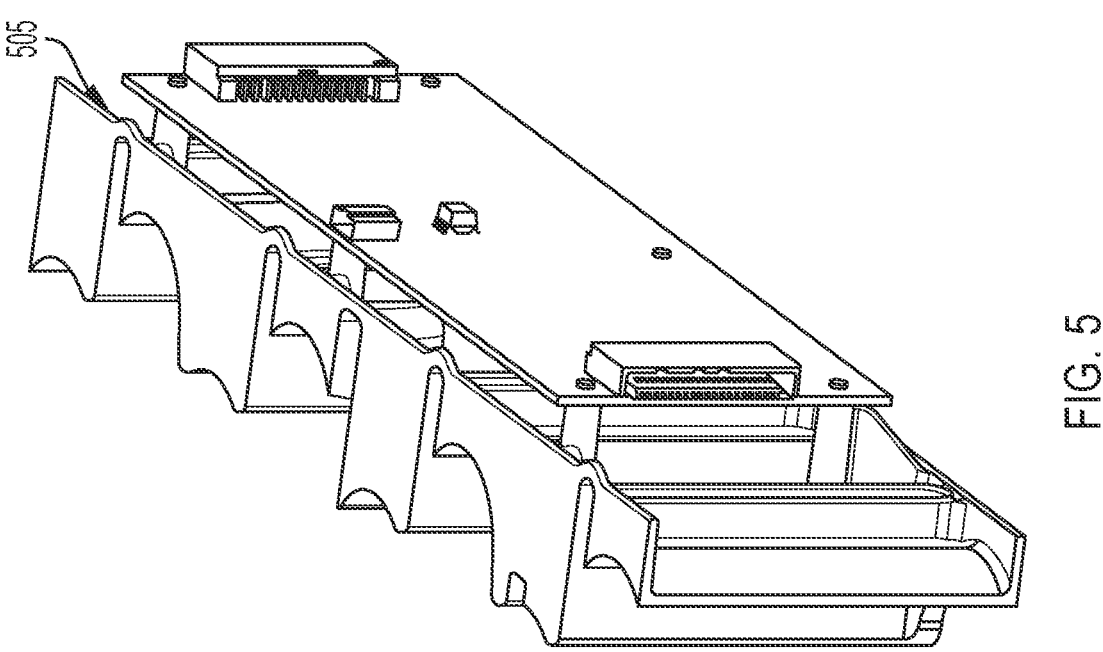

FIG. 5 depicts an example of a balancing voltage and temperature module 500. The balancing voltage and temperature (BVT) module 500 can include an assembly of various electrical components to monitor or control components of a battery system. The BVT module 500 can include a circuit board having various connectors to couple with, for example, a thermistor that can measure a temperature of the battery subassembly, battery module or a battery cell thereof, a voltage sensor or balancer that can sense or control voltage that flows through the battery subassembly, battery module or a battery cell thereof, or a communication device that can receive, transmit, or analyze data associated with the battery subassembly, battery module or a battery cell thereof. The BVT module 500 can include a short wall 505. The short wall 505 can add structural support to the BVT module 500. The short wall 505 can serve as a mounting point for electrical components like connectors, busbars, or fuses that are part of the BVT module 500. The short wall 505 can include thermally conductive material and can dissipate heat away from BVT module 500 components. The short wall 505 can include a modular design to allow the BVT module 500 to be attached or detached from a battery pack for maintenance or replacement.

Figure 6:
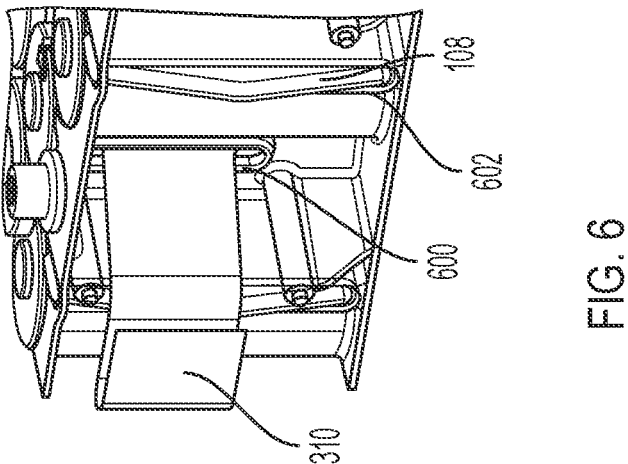
FIG. 6 depicts an example of a harness weaved through a balancing voltage and temperature module.

FIG. 6 depicts an example of a harness weaved through a BVT module. The BVT module can have multiple slots. The slot 600 in the BVT module can serve as an exit point for the harness. The slot 600 can provide a direct and efficient path for the harness 310. The slot 600 can be elongated and narrow. The slot 600 can have rounded edges. The slot 600 can be lined with abrasion-resistant materials. The abrasion-resistant materials can include Teflon lining, ceramic inserts, or reinforced nylon. The slot 602 in the BVT module can serve as an exit point for the thermal component 108. The slot 602 can have rounded edges. The slot 602 can be lined with abrasion-resistant materials. The abrasion-resistant materials can include Teflon lining, ceramic inserts, or reinforced nylon. The slot 600 and slot 602 can have different or same dimensions.

Figure 7:
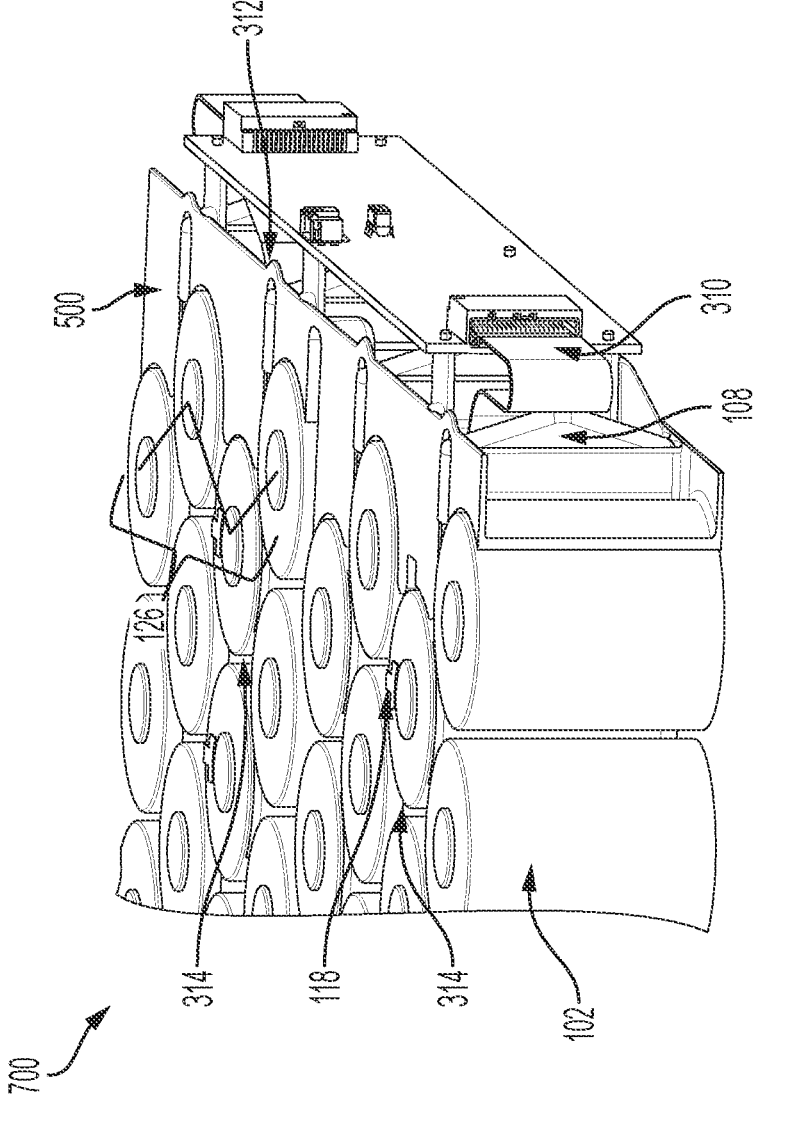
FIG. 7 depicts an example of a battery system with a harness weaved through a balancing voltage and temperature module.

FIG. 7 depicts an example of a battery system 700 with a harness weaved through a BVT module. The slot in the BVT module 500 can serve as an exit point for the end of the harness 310. The central body of the harness 314 can be between a group of cells 102. The harness can be placed between cells 102 that form a parallel group 126. The BVT module 500 can be positioned at one end of a group of cells 102. The BVT module can access data from cells 102. The BVT module 500, via the short wall 505, can be attachable or detachable from the battery cells, battery pack, harness 314, or other components. The harness 314 can be detachable from the battery cells, battery pack, BVT module 500, or other components. The BVT module 500 can include a diagnostic interface that can monitor the performance of the BVT module.

Figure 8:
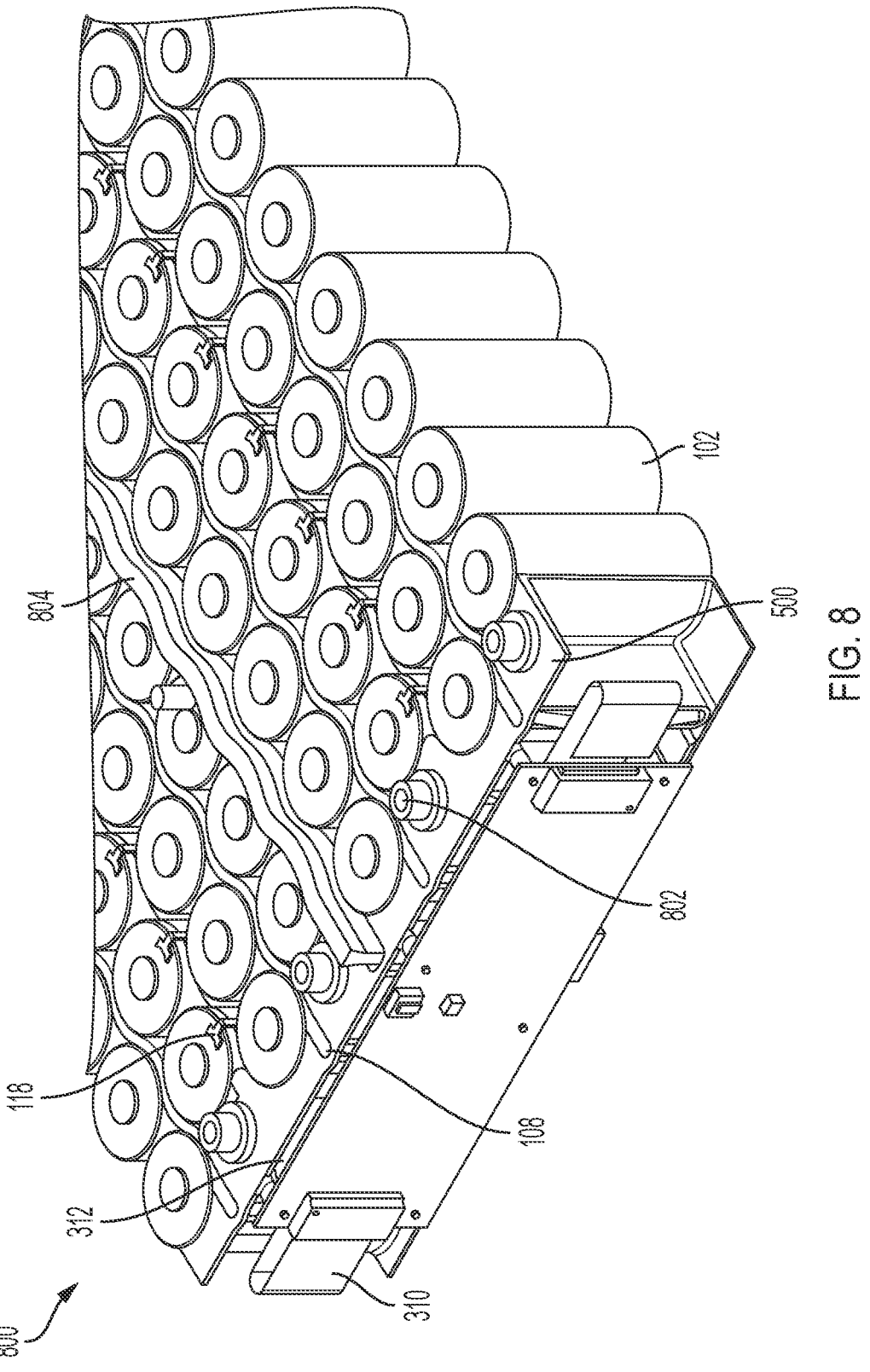
FIG. 8 depicts an example of a battery system with a harness weaved through a balancing voltage and temperature module.

FIG. 800 depicts an example of a battery system 800 with a harness weaved through a BVT module. FIG. 8 can include one or more component or functionality depicted in FIG. 7. The BVT module 500 can include nodes 802. The nodes 802 can include terminals that can facilitate further interactions or connections (e.g., modular expansions, accessory integrations, monitoring capabilities). The BVT module 500 can have a slot for a structure 804. The structure 804 can include conductor or insulator structures.

Figure 9:
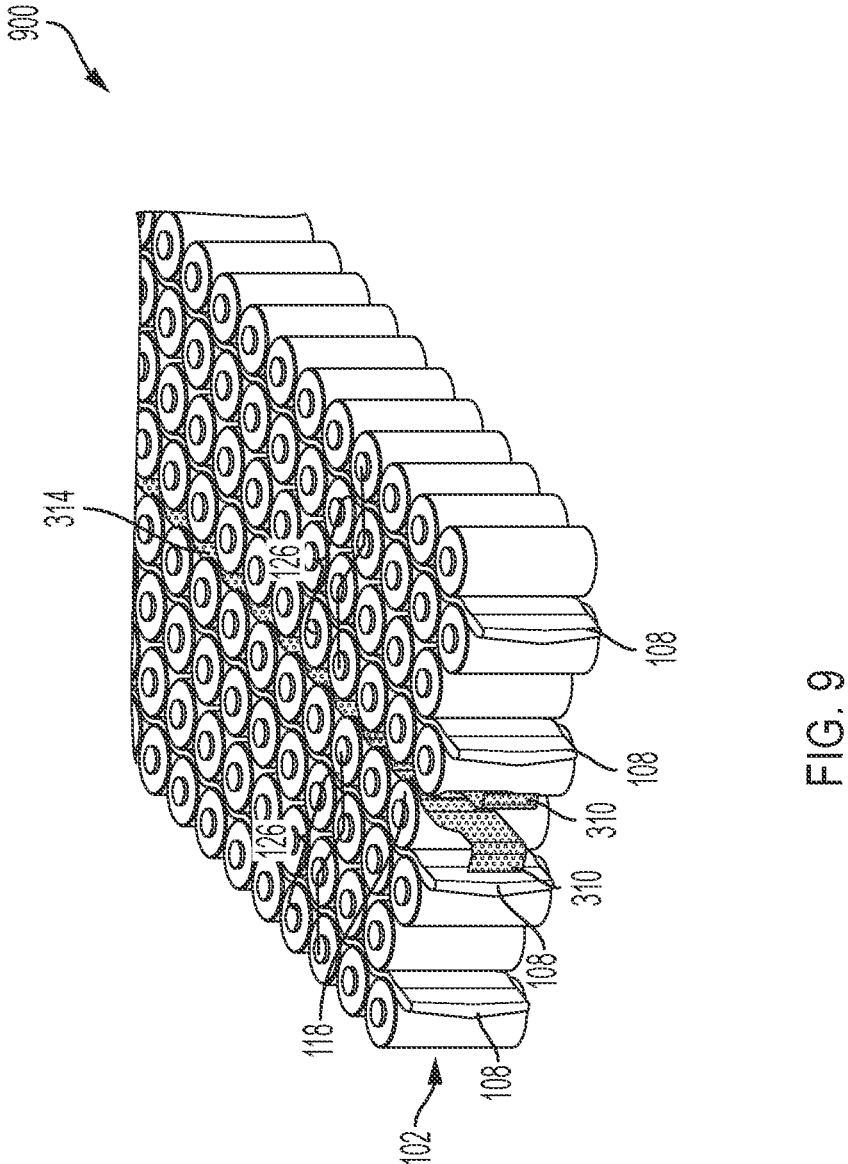
FIG. 9 depicts an example of a battery system with a harness between a group of cells.

FIG. 9 depicts an example of a battery system 900 with at least one harness that can extend between a group of cells 102. The harness can gain protection against external mechanical stresses, contaminants, or electromagnetic interference. The harness can extend between a group of cells 102 that form a parallel group 126. The harness can be placed adjacent to a thermal component 108. The harness can be placed between a group of thermal components 108.

Figure 10:
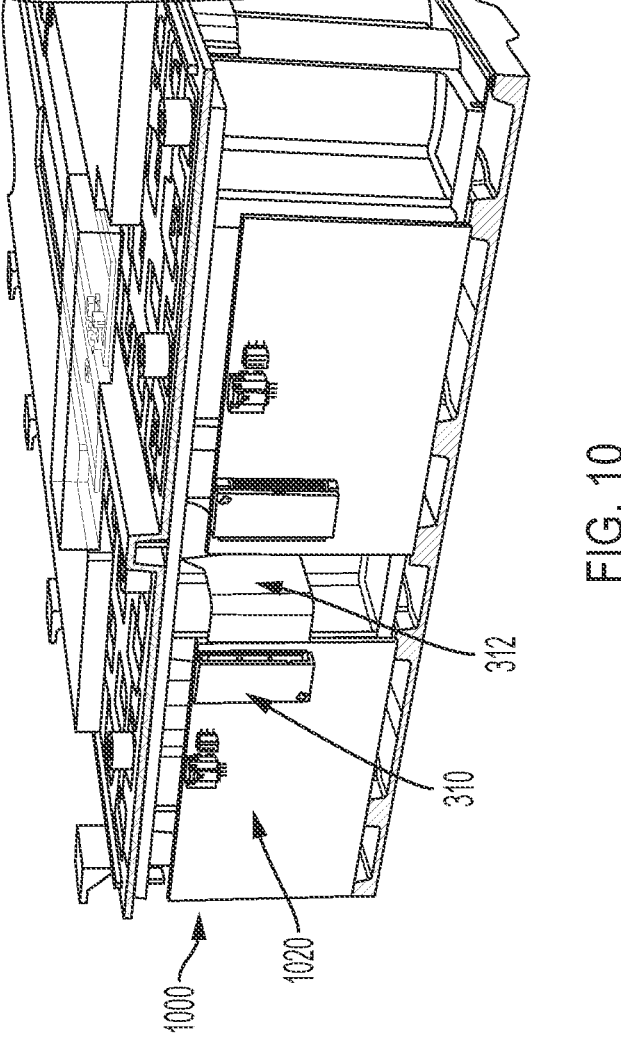
FIG. 10 depicts an example of a battery system with a harness between a group of cells weaved through a balancing voltage and temperature module.

FIG. 10 depicts an example of a battery system 1000 with at least one harness that can extend between a group of cells weaved through a BVT module 1020. FIG. 10 can include one or more component or functionality depicted in FIG. 9. FIG. 10 can include one or more component or functionality depicted in FIG. 6. BVT module 1020 can have slots that are in the middle of the BVT. BVT module 1020 can have slots that are at the ends of the BVT. The slots in the BVT module can serve as an exit point for the harness.

Figure 11:
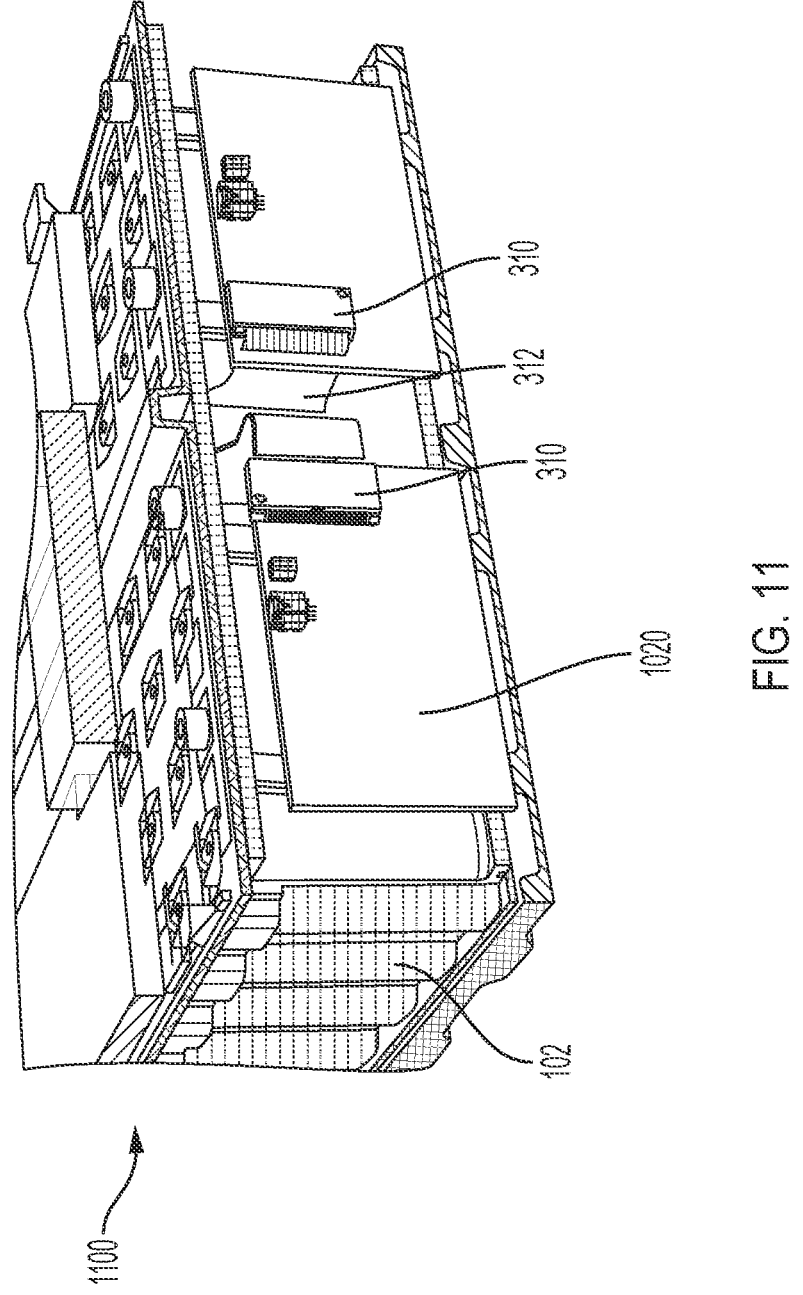
FIG. 11 depicts an example of a battery system with a harness between a group of cells weaved through a balancing voltage and temperature module.

FIG. 11 depicts an example of a battery system 1100 with at least one harness that can extend between a group of cells weaved through a BVT module 1020. FIG. 11 can include one or more component or functionality depicted in FIG. 10.

Figure 12:
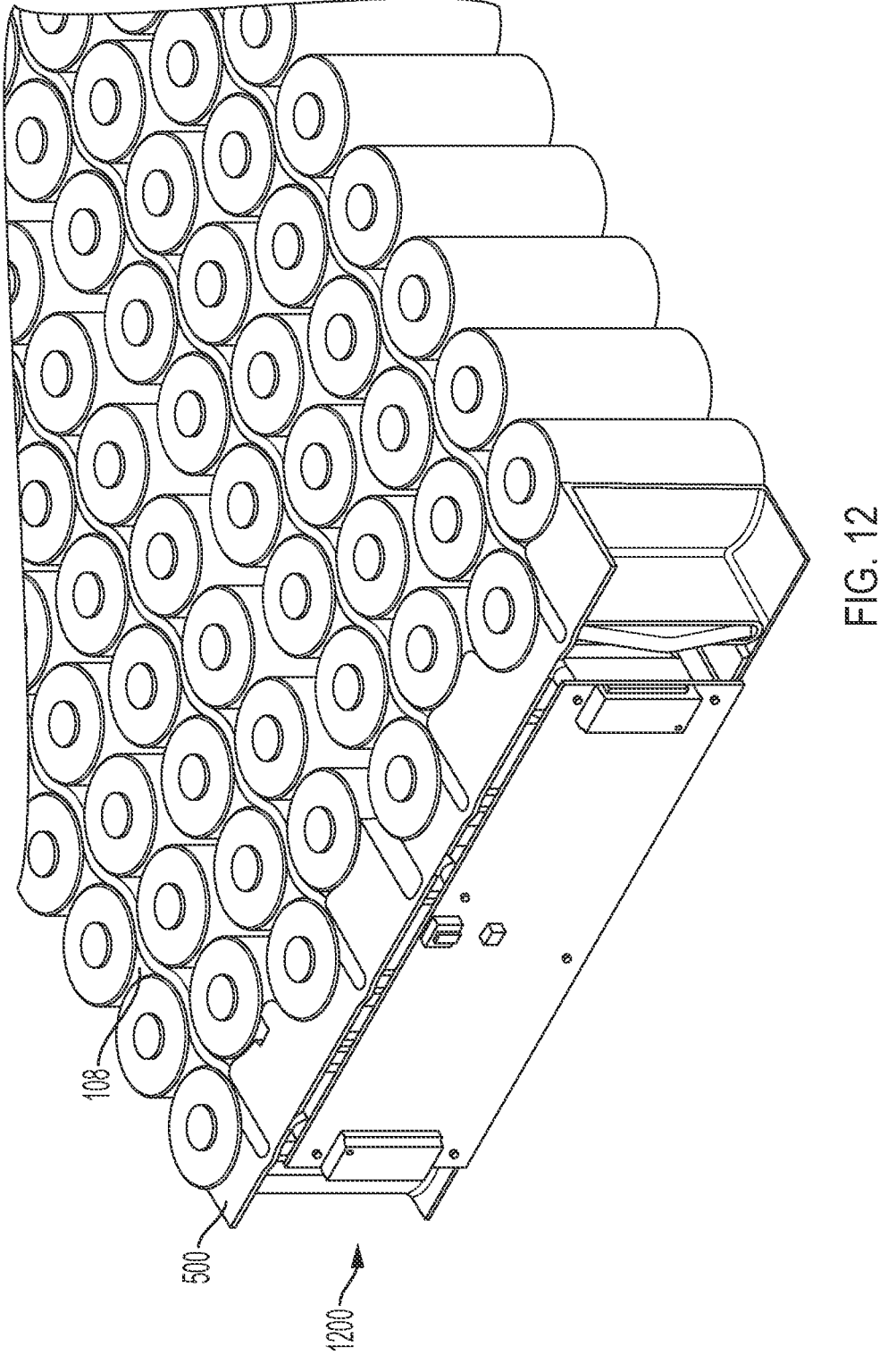
FIG. 12 depicts an example of a battery system with a balancing voltage and temperature module.

FIG. 12 depicts an example of a battery system 1200 with a BVT module 500. FIG. 12 can include one or more component or functionality depicted in FIG. 7. FIG. 12 can include one or more component or functionality depicted in FIG. 5. The BVT can have slots for thermal component 108.

Figure 13:
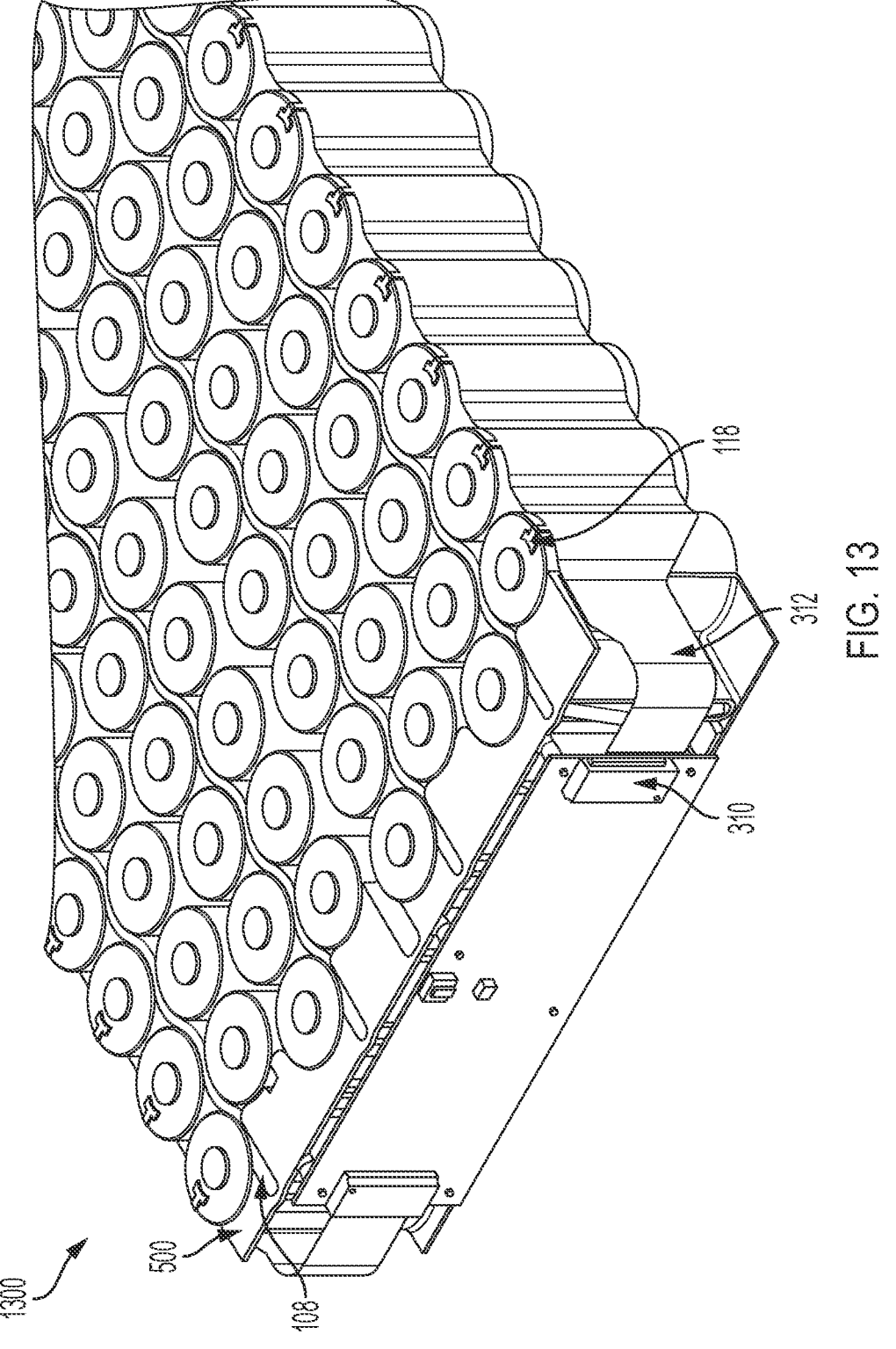
FIG. 13 depicts an example of a battery system with a harness on the outside of the group of cells with a balancing voltage and temperature module.

FIG. 13 depicts an example of a battery system 1300 with a harness on the outside of the group of cells with a balancing voltage and temperature module. FIG. 13 can include one or more component or functionality depicted in FIG. 12. At least one harness that can extend along the outside of a group of cells.

Figure 14:
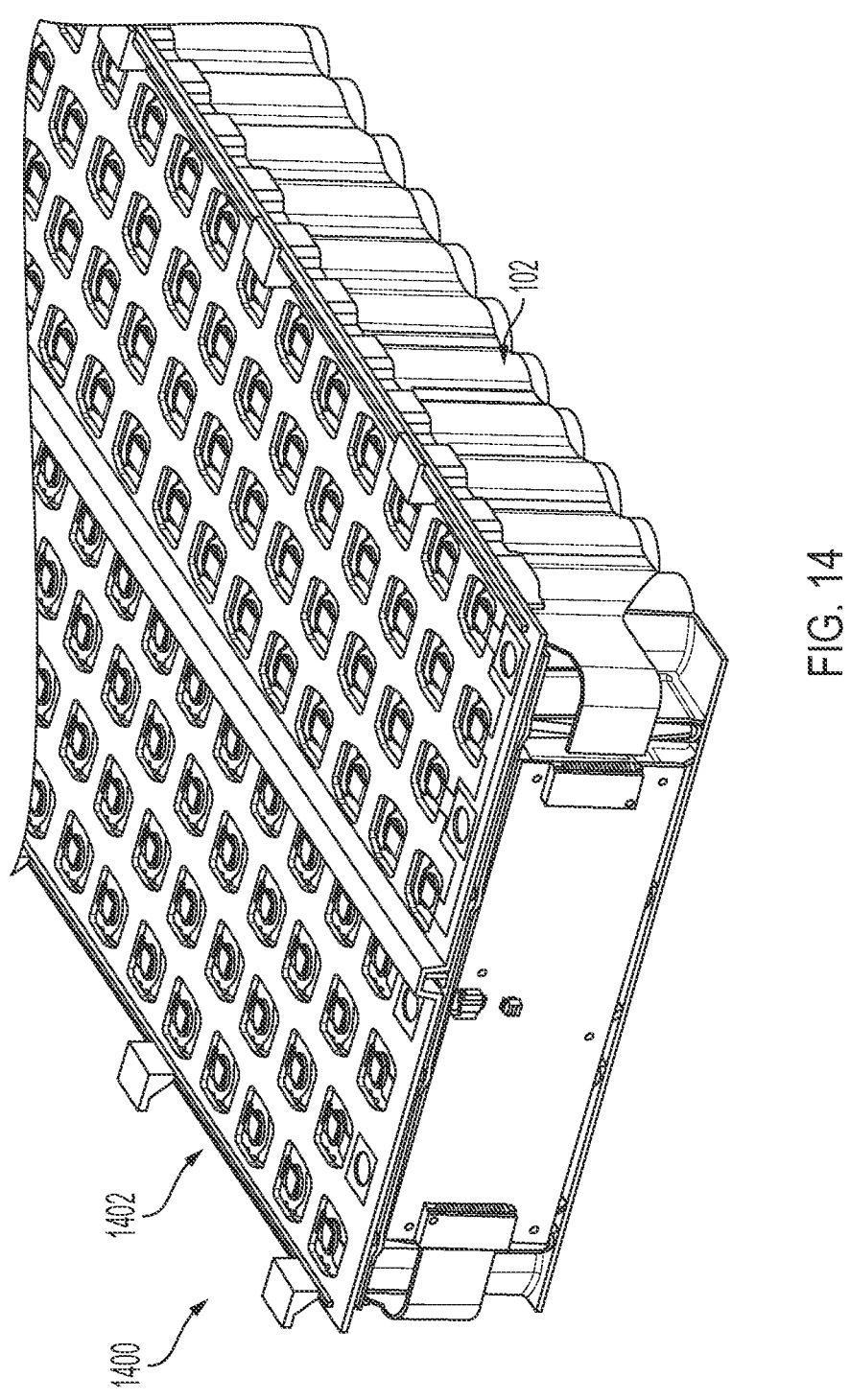
FIG. 14 depicts an example of a battery system with a harness on the outside of the group of cells with a balancing voltage and temperature module with a current collector assembly.

FIG. 14 depicts an example of a battery system 1400 with a harness on the outside of the group of cells with a BVT module. FIG. 14 can include one or more component or functionality depicted in FIG. 12. The cells 102 can have a current collector assembly 1402 placed on top of the cells 102. The current collector assembly 1402 can reduce resistance, ensure uniform current distribution, or enable efficient power transfer. The current collector assembly 1402 can be made from conductive materials such as copper or aluminum. The current collector assembly 1402 can include connectors or terminals that allow connections between the cells 102 and an external circuitry. The current collector assembly 1402 can include sensors to monitor the current flow.

Figure 15:
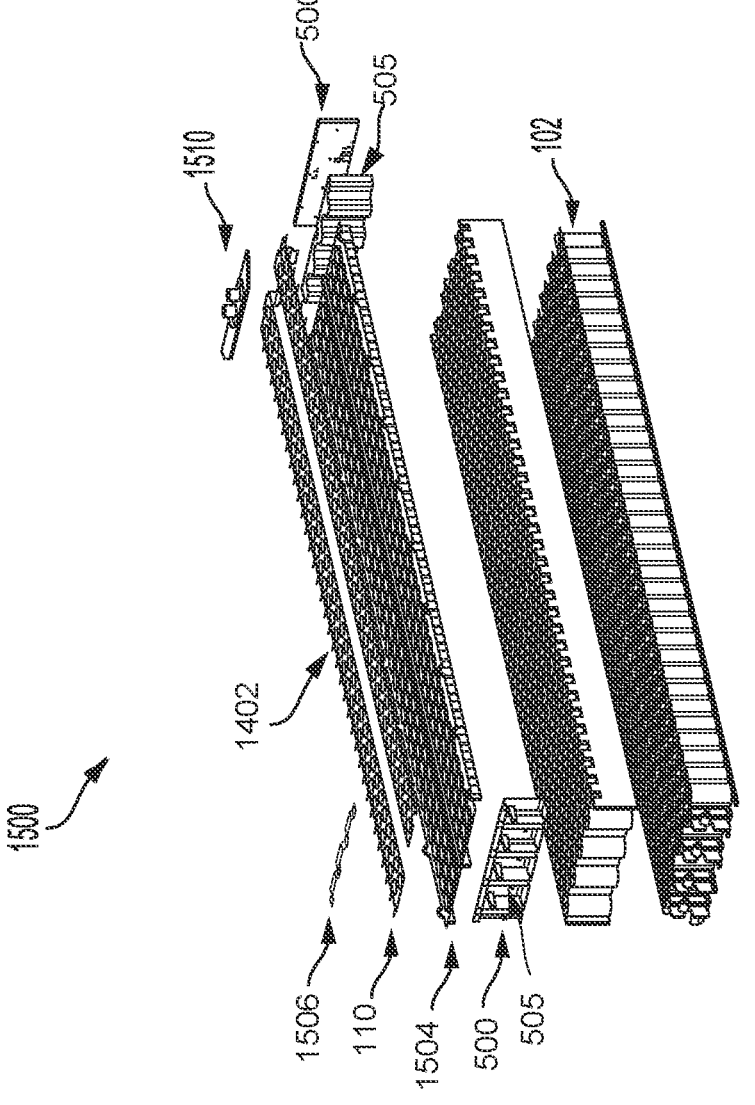
FIG. 15 depicts an example of a battery system with a harness, current collector assembly, and a balancing voltage and temperature module.

FIG. 15 depicts an example of a battery system 1500 with a harness, current collector assembly, and a BVT module. The current collector assembly 1402 can include a conductor layer 1504. The conductor layer 1504 can include a material to conduct electricity (e.g., gold, copper, aluminum, silver, or a combination of metallic metals). The materials of the conductor layer 1504 can be designed, constructed, or selected to conduct electricity. For example, the materials of the conductor layer 1504 can have a sufficient density of free electrons to allow for the transmission of electric current to provide power to one or more component of an electric vehicle, such as an electric motor or on-board computer system. The conductor can be formed by depositing the material onto a substrate following a process including at least one of physical vapor deposition, chemical vapor deposition, electroplating, chemical deposition, among others. The conductor layer 1504 can provide an electrically conductive path for electricity to and from battery cells that can be housed within a battery module. Instead of injecting the conductor layer 1504 into the insulative structure, the conductor layer 1504 can be partially removed from the insulative structure. For example, the conductor layer 1504 can be coupled to the insulative structure using an adhesive. In some arrangements, the adhesive can be removed to separate the conductor layer 1504 and the insulative structure.

The conductor layer 1504 can include a plurality of polygons or quadrilaterals (e.g., square, rhombus, parallelogram, etc.) to form spaces for the battery cells. For example, the spaces for the battery cells can be a plurality of squares. In another example, the spaces of the battery cells can be a plurality of *rhombi*. The plurality of polygons or quadrilaterals can include a symmetrical or asymmetrical arrangement. For example, one space can be offset by 3 centimeters and at a 45-degree angle from the space adjacent to it. In some arranges each space can be aligned along first axis.

The current collector assembly 1402 can include a series busbar 1506. The series busbar 1506 can include a metallic material but is not limited to copper and aluminum. The metallic material can depend on the characteristics of the current collector assembly 1402. For example, a series busbar 1506 can have an aluminum material to reduce the weight of the current collector assembly. In some arrangements, copper can be used due to the higher conductivity. In some arrangements, copper can be used to increase the longevity of the series busbar 1506. In some arrangements, the series busbar 115 can have a structure proportional to the height of the rib 115. For example, if the rib 115 is 3.2 cm, the series busbar 1506 can have a displace from the rib 115 of 4.2 cm.

The series busbar 1506 can maintain electrical current distribution in the current collector assembly 1402. The desired voltage can be established by the harness 110. The series busbar 1506 can be a centralized ground for the current collector assembly 1402. The metallic material of the series busbar 1506 can provide a low-impedance path for the current to flow to ground. For example, the series busbar 1506 can direct the current. In some arrangements, the series busbar 1506 can protect the components of the current collector assembly 1402. For example, the series busbar 1506 can reduce the possibility of an occurrence of fault currents in the current collector assembly 1402.

The short wall 505 can be used to protect the components of the current collector assembly 1402. For example, the short wall 505 can protect the harness 110, one or more terminals, and the battery cells 102. The short wall 505 can enhance serviceability of the battery system, enabling technicians to access and replace the BVT module 500. The treehouse busbar 1510 can include materials, structure, and functionality similar to the series busbar 1506. The BVT module 500 can access the state of charge of the battery cells 102 and further determine whether the battery cells 102 have sufficient voltage to operate the current collector assembly 1500. For example, an interface can be couple to the BVT module 500 to display the state of charge of the battery cells 102. The BVT module 50 and the harness 110 can work together to provide accurate voltage measurements of the battery cells 102 of a current collector assembly. For example, the harness 110 can continuously monitor the voltage of each battery cell 102 in the battery cells 102. The real-time feedback can be transmitted to the BVT module 500 to provide the interface with a continuously updated measurement of the voltage of each battery cell 102 in the battery cells 102. The combination of the harness 110 and the BVT module 500 can provide convenience of on-the-spot voltage checks and the benefits of automated, continuous monitoring to ensure optimal performance and prevent potential issues.

The harness 110 can be coupled to the top of the insulative structure of the current collector assembly 1402 or to the bottom of the insulative structure of the current collector assembly. The harness 110 can monitor the voltage at a critical point in an electrical system. For example, the volage sense harness 110 can monitor the voltage of the battery cells 102. The harness 110 placed at the top of the current collector assembly 1402 can provide an accurate voltage measurement at a particular location on the current collector assembly.

Figure 16:
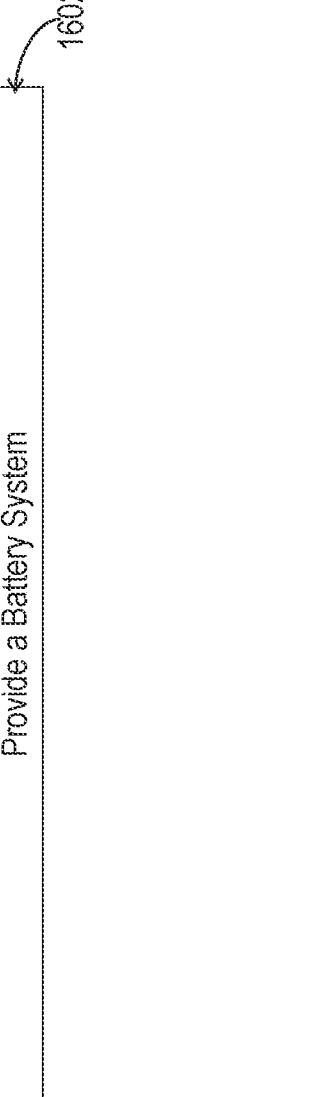
FIG. 16 is a flow diagram illustrating an example method of providing a battery system.

FIG. 16 depicts a method 1600 for providing a battery system. The method 1600 can include providing the battery the system at ACT 1602. The battery system can include a plurality of cells arranged in an array and a harness. The harness can include a circuit electrically insulated by a material, that can extend along a side of the plurality of cells. The harness can include a trace, electrically coupled to the circuit, that can contact each of the plurality of cells. The harness can measure voltage of the plurality of cells. The harness can extend along a side that is cylindrical. The harness can extend along a side that is prismatic. The harness material can include an opening to expose the trace to contact each of the plurality of cells. The harness can be bonded to of the battery cells via an electrical conductor. The harness can extend along a group of cells of the plurality of cells that are connected to form a series circuit.

Figure 17:
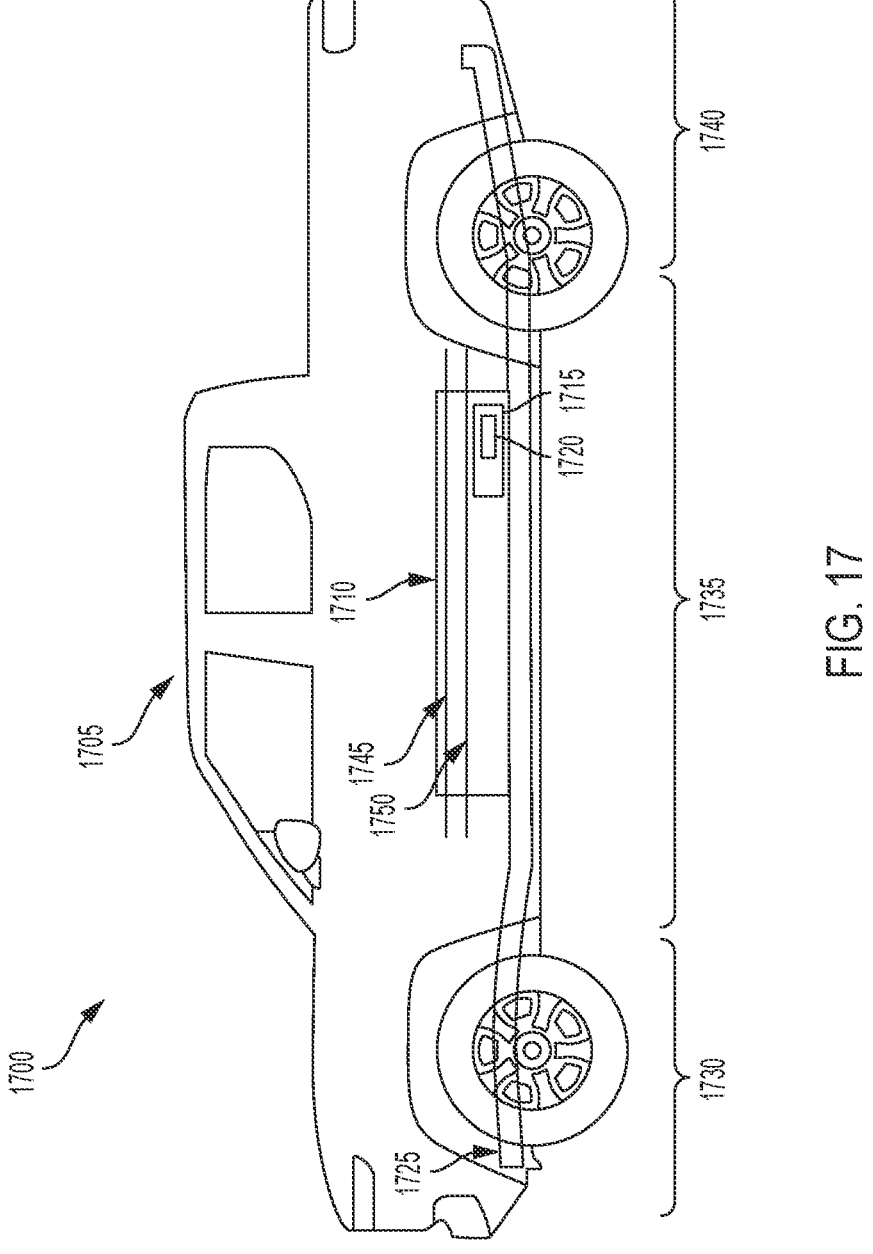
FIG. 17 depicts an example electric vehicle.

FIG. 17 depicts an example cross-sectional view 1700 of an electric vehicle 1705 installed with at least one battery pack 1710. Electric vehicles 1705 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 1710 can also be used as an energy storage system to power a building, such as a residential home or commercial building. The battery pack 1710 can include the battery system with the harness 110 as depicted in FIG. 1. Electric vehicles 1705 can be fully electric or partially electric (e.g., plug-in hybrid) and further, electric vehicles 1705 can be fully autonomous, partially autonomous, or unmanned. Electric vehicles 1705 can also be human operated or non-autonomous. Electric vehicles 1705 such as electric trucks or automobiles can include on-board battery packs 1710, batteries 1715 or battery modules 1715, or battery cells 1720 to power the electric vehicles. The electric vehicle 1705 can include a chassis 1725 (e.g., a frame, internal frame, or support structure). The chassis 1725 can support various components of the electric vehicle 1705. The chassis 1725 can span a front portion 1730 (e.g., a hood or bonnet portion), a body portion 1735, and a rear portion 1740 (e.g., a trunk, payload, or boot portion) of the electric vehicle 1705. The battery pack 1710 can be installed or placed within the electric vehicle 1705. For example, the battery pack 1710 can be installed on the chassis 1725 of the electric vehicle 1705 within one or more of the front portion 1730, the body portion 1735, or the rear portion 1740. The battery pack 1710 can include or connect with at least one busbar, e.g., a current collector element. For example, the first busbar 1745 and the second busbar 1750 can include electrically conductive material to connect or otherwise electrically couple the battery 1715, the battery modules 1715, or the battery cells 1720 with other electrical components of the electric vehicle 1705 to provide electrical power to various systems or components of the electric vehicle 1705.

Figure 18A:
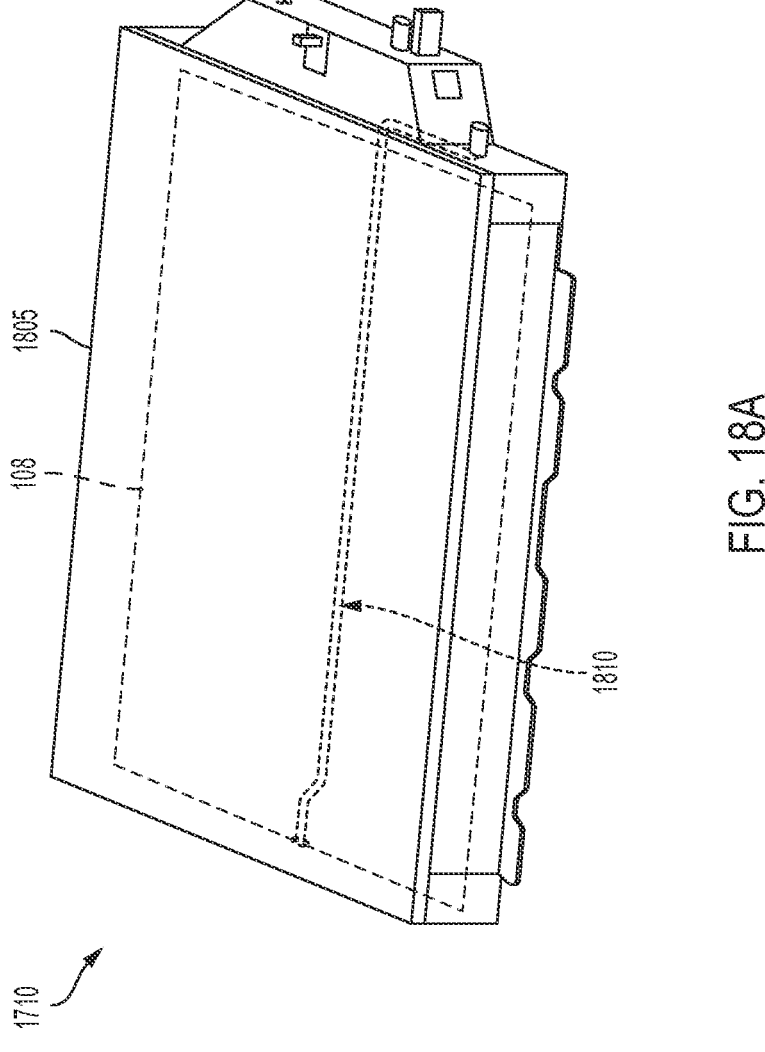
FIG. 18A depicts an example of one or more battery packs.

FIG. 18A depicts an example battery pack 1710. Referring to FIG. 18A, among others, the battery pack 1710 can provide power to electric vehicle 1705. Referring to FIG. 18A, the battery pack 1710 can include the battery system with the harness 110 as depicted in FIG. 1. Battery packs 1710 can include any arrangement or network of electrical, electronic, mechanical or electromechanical devices to power a vehicle of any type, such as the electric vehicle 1705. The battery pack 1710 can include at least one housing 1805. The housing 1805 can include at least one battery module 1715 or at least one battery cell 1720, as well as other battery pack components. The battery module 1715 can be or can include one or more groups of prismatic cells, cylindrical cells, pouch cells, or other form factors of battery cells 1720. The housing 1805 can include a shield on the bottom or underneath the battery module 1715 to protect the battery module 1715 and/or cells 1720 from external conditions, for example if the electric vehicle 1705 is driven over rough terrains (e.g., off-road, trenches, rocks, etc.) The battery pack 1710 can include at least one cooling line 1810 that can distribute fluid through the battery pack 1710 as part of a thermal/temperature control or heat exchange system that can also include at least one thermal component (e.g., cold plate) 108. The thermal component 108 can be positioned in relation to a top submodule and a bottom submodule, such as in between the top and bottom submodules, among other possibilities. The battery pack 1710 can include any number of thermal components 108. For example, there can be one or more thermal components 108 per battery pack 1710, or per battery module 1715. At least one cooling line 1810 can be coupled with, part of, or independent from the thermal component 108.

Figure 18B:
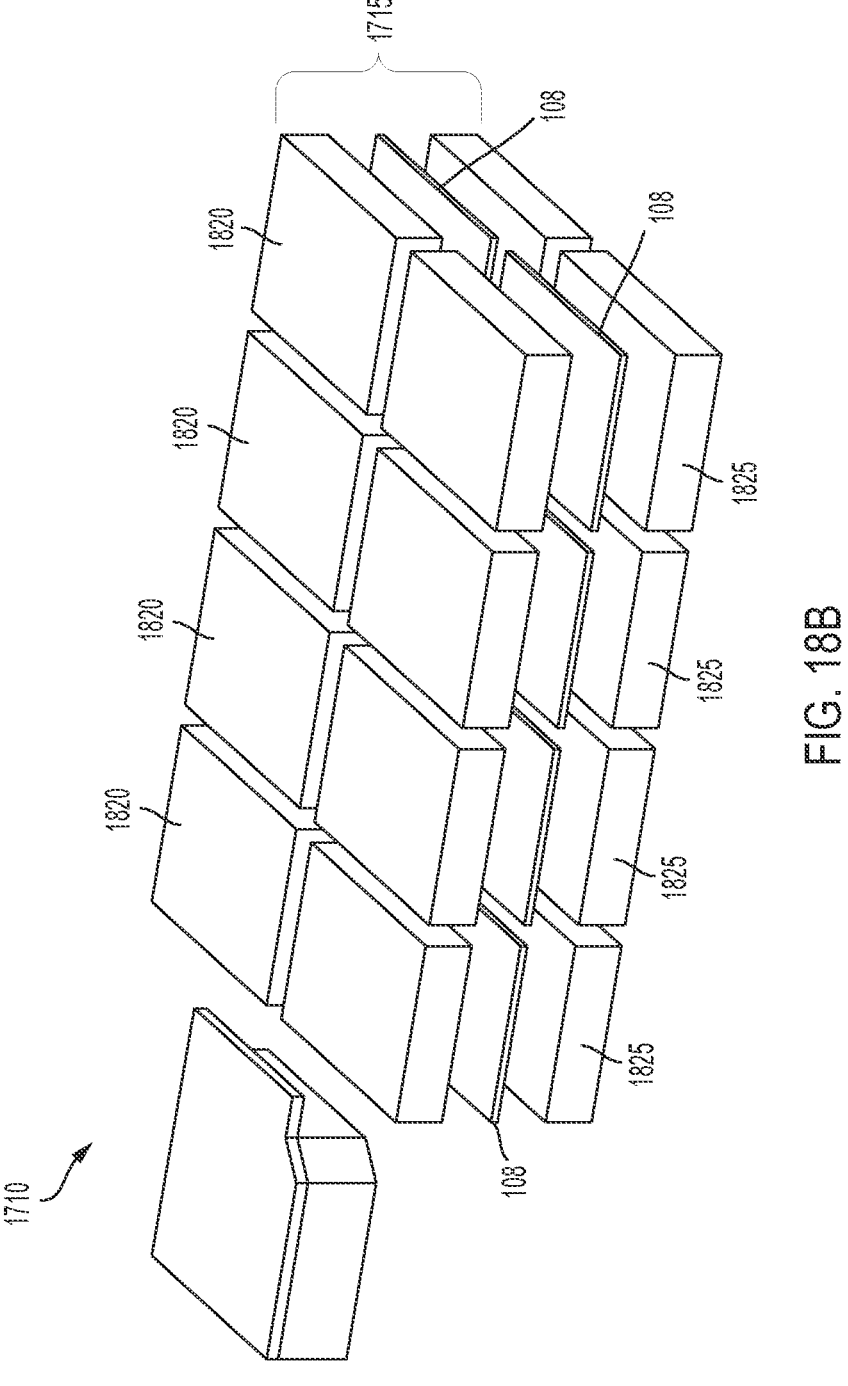
FIG. 18B depicts an example of one or more battery modules.

FIG. 18B depicts example battery modules 1715, and FIGS. 17C, 17D and 17E depict an example cross sectional view of a battery cell 1720. The battery modules 1715 can include at least one submodule. For example, the battery modules 1715 can include at least one first (e.g., top) submodule 1820 or at least one second (e.g., bottom) submodule 1825. At least one thermal component 108 can be disposed between the top submodule 1820 and the bottom submodule 1825. For example, one thermal component 108 can be configured for heat exchange with one battery module 1715. The thermal component 108 can be disposed or thermally coupled between the top submodule 1820 and the bottom submodule 1825. One thermal component 108 can also be thermally coupled with more than one battery module 1715 (or more than two submodules 1820, 1825). The thermal components 108 shown adjacent to each other can be combined into a single thermal component 108 that spans the size of one or more submodules 1820 or 1825. The thermal component 108 can be positioned underneath submodule 1820 and over submodule 1825, in between submodules 1820 and 1825, on one or more sides of submodules 1820, 1825, among other possibilities. The thermal component 108 can be disposed in sidewalls, cross members, structural beams, among various other components of the battery pack, such as battery pack 1710 described above. The battery submodules 1820, 1825 can collectively form one battery module 1715. In some examples each submodule 1820, 1825 can be considered as a complete battery module 1715, rather than a submodule.

The battery modules 1715 can each include a plurality of battery cells 1720. The battery modules 1715 can be disposed within the housing 1805 of the battery pack 1710. The battery modules 1715 can include battery cells 1720 that are cylindrical cells or prismatic cells, for example. The battery module 1715 can operate as a modular unit of battery cells 1720. For example, a battery module 1715 can collect current or electrical power from the battery cells 1720 that are included in the battery module 1715 and can provide the current or electrical power as output from the battery pack 1710. The battery pack 1710 can include any number of battery modules 1715. For example, the battery pack can have one, two, three, four, five, six, seven, eight, nine, ten, eleven, twelve or other number of battery modules 1715 disposed in the housing 1705. It should also be noted that each battery module 1715 can include a top submodule 1820 and a bottom submodule 1825, possibly with a thermal component 108 in between the top submodule 1820 and the bottom submodule 1825. The battery pack 1710 can include or define a plurality of areas for positioning of the battery module 1715 and/or cells 1720. The battery modules 1715 can be square, rectangular, circular, triangular, symmetrical, or asymmetrical. In some examples, battery modules 1715 may be different shapes, such that some battery modules 1715 are rectangular but other battery modules 1715 are square shaped, among other possibilities. The battery module 1715 can include or define a plurality of slots, holders, or containers for a plurality of battery cells 1720. It should be noted the illustrations and descriptions herein are provided for example purposes and should not be interpreted as limiting. For example, the battery cells 1720 can be inserted in the battery pack 1710 without battery modules 1820 and 1825. The battery cells 1720 can be disposed in the battery pack 1710 in a cell-to-pack configuration without modules 1820 and 1825, among other possibilities.

Figure 18C:
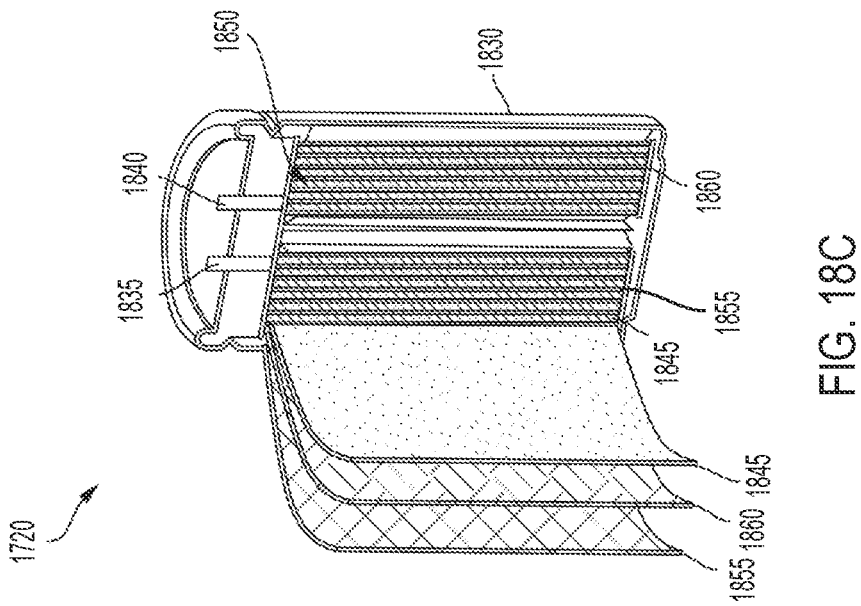
FIG. 18C depicts a cross sectional view of a battery cell.
Figure 18D:
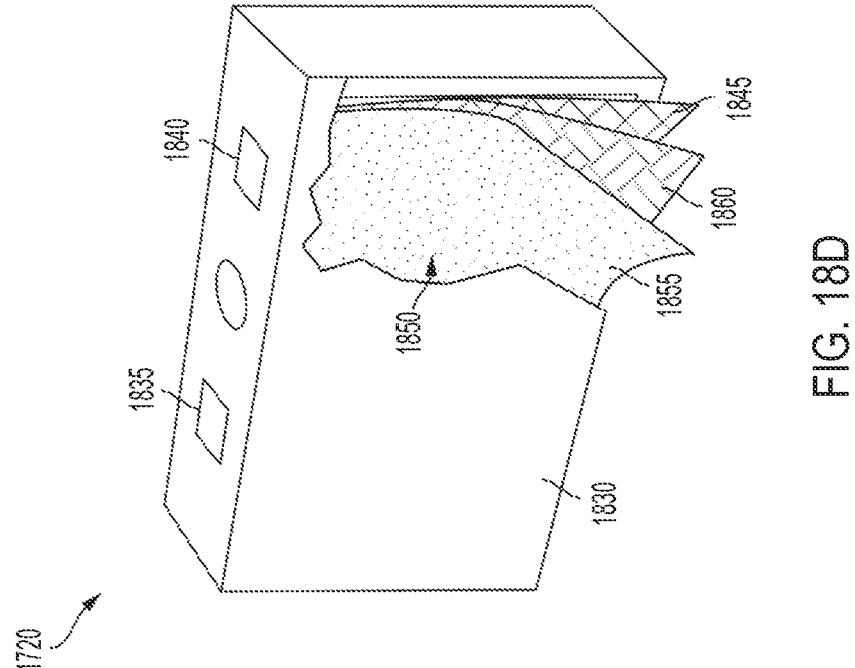
FIG. 18D depicts a cross sectional view of a battery cell.
Figure 18E:
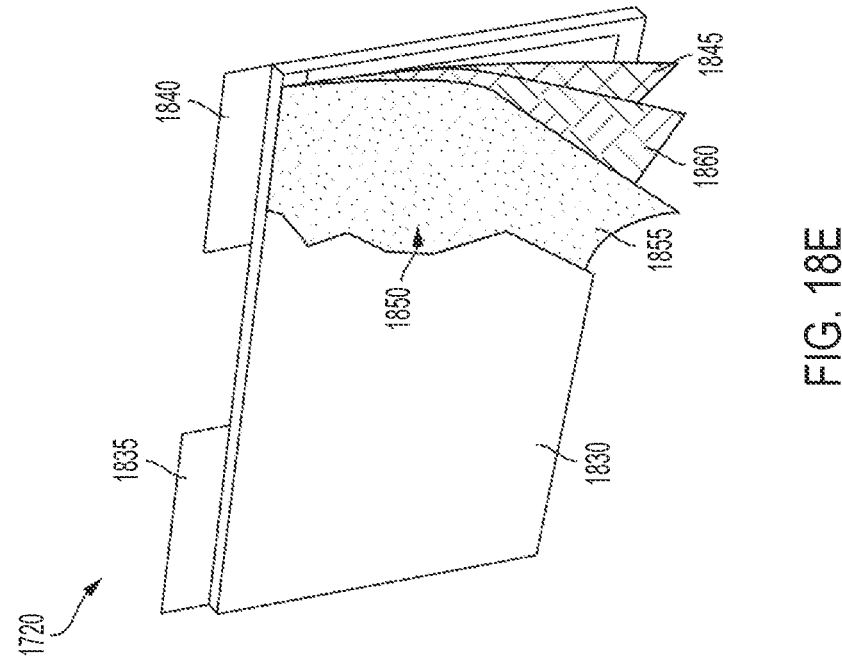
FIG. 18E depicts a cross sectional view of a battery cell.

Battery cells 1720 have a variety of form factors, shapes, or sizes. For example, battery cells 1720 can have a cylindrical, rectangular, square, cubic, flat, pouch, elongated or prismatic form factor. As depicted in FIG. 18C, for example, the battery cell 1720 can be cylindrical. As depicted in FIG. 18D, for example, the battery cell 1720 can be prismatic. As depicted in FIG. 18E, for example, the battery cell 1720 can include a pouch form factor. Battery cells 1720 can be assembled, for example, by inserting a winded or stacked electrode roll (e.g., a jelly roll) including electrolyte material into at least one battery cell housing 1830. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 1720 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 1720. The housing 1830 can be of various shapes, including cylindrical or rectangular, for example. Electrical connections can be made between the electrolyte material and components of the battery cell 1720. For example, electrical connections to the electrodes with at least some of the electrolyte material can be formed at two points or areas of the battery cell 1720, for example to form a first polarity terminal 1835 (e.g., a positive or anode terminal) and a second polarity terminal 1840 (e.g., a negative or cathode terminal). The polarity terminals can be made from electrically conductive materials to carry electrical current from the battery cell 1720 to an electrical load, such as a component or system of the electric vehicle 1705.

For example, the battery cell 1720 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 1720 to separate the anode and cathode from each other and to facilitate transfer of lithium ions between the anode and cathode. It should be noted that battery cell 1720 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 1720 can be included in battery modules 1715 or battery packs 1710 to power components of the electric vehicle 1705. The battery cell housing 1830 can be disposed in the battery module 1715, the battery pack 1710, or a battery array installed in the electric vehicle 1705. The housing 1830 can be of any shape, such as cylindrical with a circular (e.g., as depicted in FIG. 18C, among others), elliptical, or ovular base, among others. The shape of the housing 1830 can also be prismatic with a polygonal base, as shown in FIG. 18D, among others. As shown in FIG. 18E, among others, the housing 1830 can include a pouch form factor. The housing 1830 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 1830 of the battery cell 1720 can include one or more materials with various electrical conductivity or thermal conductivity, or a combination thereof. The electrically conductive and thermally conductive material for the housing 1830 of the battery cell 1720 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 1830 of the battery cell 1720 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1830 of the battery cell 1720 is prismatic (e.g., as depicted in FIG. 18D, among others) or cylindrical (e.g., as depicted in FIG. 18C, among others), the housing 1830 can include a rigid or semi-rigid material such that the housing 1830 is rigid or semi-rigid (e.g., not easily deformed or manipulated into another shape or form factor). In examples where the housing 1830 includes a pouch form factor (e.g., as depicted in FIG. 18E, among others), the housing 1830 can include a flexible, malleable, or non-rigid material such that the housing 1830 can be bent, deformed, manipulated into another form factor or shape.

The battery cell 1720 can include at least one anode layer 1845, which can be disposed within the cavity 1850 defined by the housing 1830. The anode layer 1845 can include a first redox potential. The anode layer 1845 can receive electrical current into the battery cell 1720 and output electrons during the operation of the battery cell 1720 (e.g., charging or discharging of the battery cell 1720). The anode layer 1845 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 1720 can include at least one cathode layer 1855 (e.g., a composite cathode layer compound cathode layer, a compound cathode, a composite cathode, or a cathode). The cathode layer 1855 can include a second redox potential that can be different than the first redox potential of the anode layer 1845. The cathode layer 1855 can be disposed within the cavity 1850. The cathode layer 1855 can output electrical current out from the battery cell 1720 and can receive electrons during the discharging of the battery cell 1720. The cathode layer 1855 can also receive lithium ions during the discharging of the battery cell 1720. Conversely, the cathode layer 1855 can receive electrical current into the battery cell 1720 and can output electrons during the charging of the battery cell 1720. The cathode layer 1855 can release lithium ions during the charging of the battery cell 1720.

The battery cell 1720 can include a layer 1860 disposed within the cavity 1850. The layer 1860 can include a solid electrolyte layer. The layer 1860 can include a separator wetted by a liquid electrolyte. The layer 1860 can include a polymeric material. The layer 1860 can include a polymer separator. The layer 1860 can be arranged between the anode layer 1845 and the cathode layer 1855 to separate the anode layer 1845 and the cathode layer 1855. The polymer separator can physically separate the anode and cathode from a cell short circuit. A separator can be wetted with a liquid electrolyte. The liquid electrolyte can be diffused into the anode layer 1845. The liquid electrolyte can be diffused into the cathode layer 1855. The layer 1860 can help transfer ions (e.g., $Li^+$ ions) between the anode layer 1845 and the cathode layer 1855. The layer 1860 can transfer $Li^+$ cations from the anode layer 1845 to the cathode layer 1855 during the discharge operation of the battery cell 1720. The layer 1860 can transfer lithium ions from the cathode layer 1855 to the anode layer 1845 during the charge operation of the battery cell 1720.

The redox potential of layers (e.g., the first redox potential of the anode layer 1845 or the second redox potential of the cathode layer 1855) can vary based on a chemistry of the respective layer or a chemistry of the battery cell 1720. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 1855). Lithium-ion batteries can include a graphite chemistry, a silicon-graphite chemistry, or a lithium metal chemistry for the anode layer (e.g., the anode layer 1845).

For example, lithium-ion batteries can include an olivine phosphate ($LiMPO_4$, M=Fe and/or Co and/or Mn and/or Ni)) chemistry, LISICON or NASICON Phosphates ($Li_3M_2$ $(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 1855). Lithium-ion batteries can include a graphite chemistry, a silicon-graphite chemistry, or a lithium metal chemistry for the anode layer (e.g., the anode layer 1845). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 1855) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 1845) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrins (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 1860 can include or be made of a liquid electrolyte material. For example, the layer 1860 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 1860 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. Liquid electrolyte is not necessarily disposed near the layer 1860, but the liquid electrolyte can fill the battery cells 1720 in many different ways. The layer 1860 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO$_3$ (A=Li, Ca, Sr, La, and B=Al, Ti), garnet-type with formula A$_3$B$_2$(XO$_4$)$_3$ (A=Ca, Sr, Ba and X=Nb, Ta), lithium phosphorous oxy-nitride (Li$_x$PO$_y$N$_z$). In some embodiments, the solid electrolyte layer can include a glassy, ceramic and/or crystalline sulfide-based electrolyte (e.g., Li$_3$PS$_4$, Li$_7$P$_3$S$_{11}$, Li$_2$S—P$_2$S$_5$, Li$_2$S—B$_2$S$_3$, SnS—P$_2$S$_5$, Li$_2$S—SiS$_2$, Li$_2$S—P$_2$S$_5$, Li$_2$S—GeS$_2$, Li$_{10}$GeP$_2$S$_{12}$) and/or sulfide-based lithium argyrodites with formula Li$_6$PS$_5$X (X=Cl, Br) like Li$_6$PS$_5$Cl). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 1860 includes a liquid electrolyte material, the layer 1860 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 1860 can include at least one additive. The additives can be or include vinylidene carbonate, fluoroethylene carbonate, ethyl propionate, methyl propionate, methyl acetate, ethyl acetate, or a mixture of any two or more thereof. The layer 1860 can include a lithium salt material. For example, the lithium salt can be lithium perchlorate, lithium hexafluorophosphate, lithium bis(fluorosulfonyl)imide, lithium bis (trifluorosulfonyl)imide, or a mixture of any two or more thereof. The lithium salt may be present in the layer 1860 from greater than 0 M to about 1.5 M. Once disposed to the battery cell 1720, liquid electrolyte can be present and touching battery subcomponents present within the battery cell 1720. The battery subcomponents can include the cathode, the anode, the separator, the current collector, etc.

Figure 19:
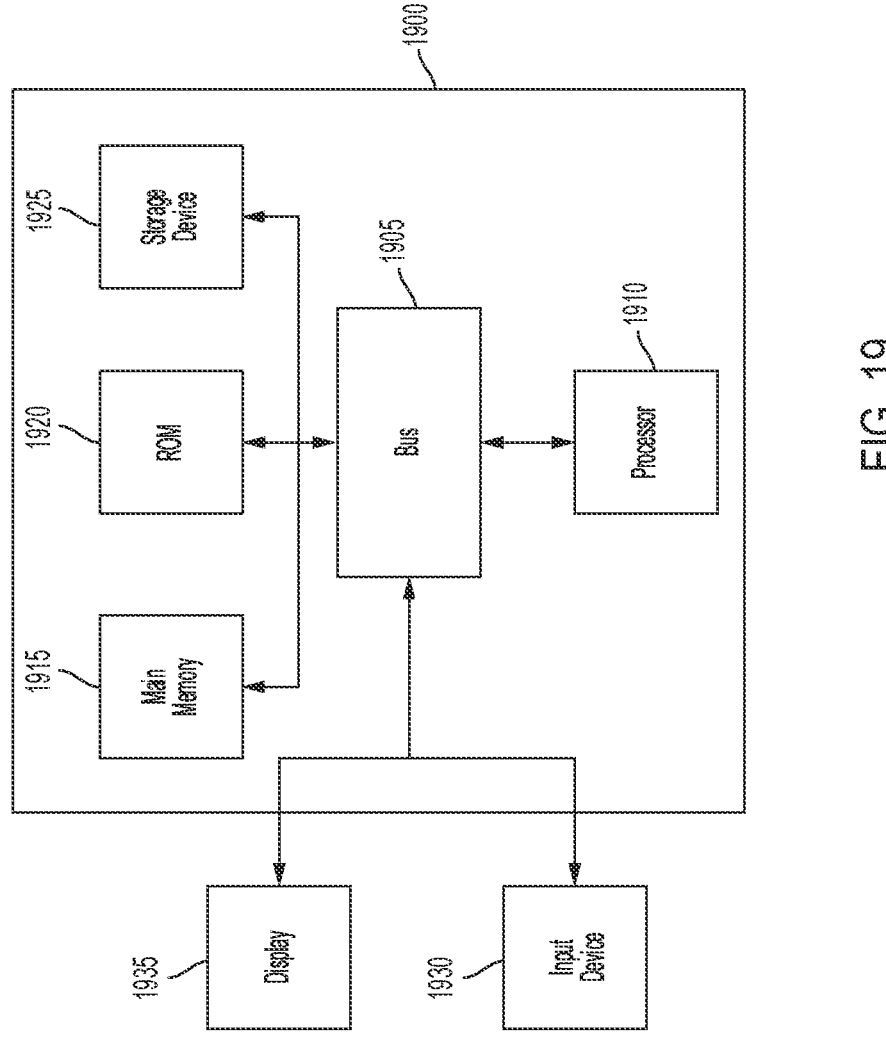
FIG. 19 is a block diagram illustrating an architecture for a computer system that can be employed to implement elements of the systems and methods described and illustrated herein.

FIG. 19 depicts an example block diagram of an example computer system 1900. The computer system or computing device 1900 can include or be used to implement a data processing system or its components. The computing system 1900 includes at least one bus 1905 or other communication component for communicating information and at least one processor 1910 or processing circuit coupled to the bus 1905 for processing information. The computing system 1900 can also include one or more processors 1910 or processing circuits coupled to the bus for processing information. The computing system 1900 also includes at least one main memory 1915, such as a random access memory (RAM) or other dynamic storage device, coupled to the bus 1905 for storing information, and instructions to be executed by the processor 1910. The main memory 1915 can be used for storing information during execution of instructions by the processor 1910. The computing system 1900 may further include at least one read only memory (ROM) 1920 or other static storage device coupled to the bus 1905 for storing static information and instructions for the processor 1910. A storage device 1925, such as a solid state device, magnetic disk or optical disk, can be coupled to the bus 1905 to persistently store information and instructions.

The computing system 1900 may be coupled via the bus 1905 to a display 1935, such as a liquid crystal display, or active matrix display, for displaying information to a user such as a driver of the electric vehicle 1705 or other end user. An input device 1930, such as a keyboard or voice interface may be coupled to the bus 1905 for communicating information and commands to the processor 1910. The input device 1930 can include a touch screen display 1935. The input device 1930 can also include a cursor control, such as a mouse, a trackball, or cursor direction keys, for communicating direction information and command selections to the processor 1910 and for controlling cursor movement on the display 1935.

The processes, systems and methods described herein can be implemented by the computing system 1900 in response to the processor 1910 executing an arrangement of instructions contained in main memory 1915. Such instructions can be read into main memory 1915 from another computer-readable medium, such as the storage device 1925. Execution of the arrangement of instructions contained in main memory 1915 causes the computing system 1900 to perform the illustrative processes described herein. One or more processors in a multi-processing arrangement may also be employed to execute the instructions contained in main memory 1915. Hard-wired circuitry can be used in place of or in combination with software instructions together with the systems and methods described herein. Systems and methods described herein are not limited to any specific combination of hardware circuitry and software.

Although an example computing system has been described in FIG. 19, the subject matter including the operations described in this specification can be implemented in other types of digital electronic circuitry, or in computer software, firmware, or hardware, including the structures disclosed in this specification and their structural equivalents, or in combinations of one or more of them.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially"

or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery system, comprising:
a plurality of cells arranged in an array;
a harness, comprising a circuit electrically insulated by a material, that extends along a side of the plurality of cells, wherein the material comprises an opening to expose a trace to contact each cell of the plurality of cells; and
the harness comprising:
the trace, electrically coupled to the circuit, to contact each cell of the plurality of cells to measure voltage of the plurality of cells, wherein the trace extends from the harness to contact a top portion of each cell of the plurality of cells;
a first portion that has a first arc shape to correspond to a curvature of a lateral surface of a first cell of the plurality of cells;
a second portion having a planar shape disposed between the first cell and a second cell of the plurality of cells, the second cell adjacent to the first cell; and
a third portion that has a second arc shape corresponding to a curvature of a lateral surface of the second cell.

2. The battery system of claim 1, wherein the circuit is configured to be flexible.

3. The battery system of claim 1, wherein the side along which the harness extends is cylindrical.

4. The battery system of claim 1, comprising:
the harness bonded to each cell of the plurality of cells via an adhesive.

5. The battery system of claim 1, comprising:
the harness bonded to each cell of the plurality of cells via an electrical conductor.

6. The battery system of claim 1, comprising:
the harness bonded to each cell of the plurality of cells via at least one of a laser weld or a solder.

7. The battery system of claim 1, comprising:
the harness to extend along a group of cells of the plurality of cells that are connected to form a series circuit.

8. The battery system of claim 1, wherein a height of the harness is less than a height of each cell of the plurality of cells.

9. The battery system of claim 1, comprising:
an interface system integrated into the harness; and
the interface system configured to facilitate electrical and data connections between the harness and an external monitoring or control system harness.

10. The battery system of claim 1, wherein the harness includes a shock absorption feature to mitigate mechanical shocks and vibrations.

11. A method, comprising:
providing a battery system comprising:
a plurality of cells arranged in an array;
a harness, comprising a circuit electrically insulated by a material, that extends along a side of the plurality of cells, wherein the material comprises an opening to expose a trace to contact each cell of the plurality of cells; and
the harness comprising:
the trace, electrically coupled to the circuit, to contact each cell of the plurality of cells to measure voltage of the plurality of cells, wherein the trace extends from the harness to contact a top portion of each cell of the plurality of cells;
a first portion that has a first arc shape to correspond to a curvature of a lateral surface of a first cell of the plurality of cells;
a second portion having a planar shape disposed between the first cell and a second cell of the plurality of cells, the second cell adjacent to the first cell; and
a third portion that has a second arc shape corresponding to a curvature of a lateral surface of the second cell.

12. The method of claim 11, comprising:
bonding the harness to each cell of the plurality of cells via an electrical conductor.

13. The method of claim 11, wherein the harness extends along a group of cells of the plurality of cells that are connected to form a series circuit.

14. An electric vehicle, comprising:
a battery system, comprising:
a plurality of cells arranged in an array;
a harness, comprising a circuit electrically insulated by a material, that extends along a side of the plurality of cells, wherein the material comprises an opening to expose a trace to contact each cell of the plurality of cells; and
the harness comprising:
the trace, electrically coupled to the circuit, to contact each cell of the plurality of cells to measure voltage of the plurality of cells, wherein the trace extends from the harness to contact a top portion of each cell of the plurality of cells;
a first portion that has a first arc shape to correspond to a curvature of a lateral surface of a first cell of the plurality of cells;
a second portion having a planar shape disposed between the first cell and a second cell of the plurality of cells, the second cell adjacent to the first cell; and
a third portion that has a second arc shape corresponding to a curvature of a lateral surface of the second cell.

15. The battery system of claim 1, wherein the battery system further comprises:
a current collector assembly placed on a top surface of the plurality of cells; and
the current collector assembly comprising:
a conductor layer configured to:
provide an electrically conductive path for electricity to the plurality of cells and from the plurality of cells.

16. The battery system of claim 15, wherein the battery system further comprises:
a series busbar configured to:
maintain electrical current distribution; and
provide a low-impedance path for current to flow to ground, protecting components of the current collector assembly.

17. The battery system of claim 16, wherein the battery system further comprises:

a balancing voltage and temperature module at one end, wherein the balancing voltage and temperature module is configured to:

measure at least one of a temperature or a state of charge of at least one of a first group of cells of the plurality of cells or a second group of cells of the plurality of cells;

sense and control voltage flows through at least one of the first group of cells of the plurality of cells or the second group of cells of the plurality of cells; and provide real-time feedback of temperature and voltage flows of at least one of the first group of cells of the plurality of cells or the second group of cells of the plurality of cells.

18. The battery system of claim 1, wherein the harness further comprises a segment shorter than a central body of the harness.

19. The battery system of claim 1, wherein the harness further comprises a plurality of sensors configured to monitor voltage and temperature.

20. The battery system of claim 1, wherein the harness extends along a side of a second plurality of cells.

21. The battery system of claim 20, wherein the plurality of cells and the second plurality of cells form a parallel group.

* * * * *